United States Patent
Lines

(10) Patent No.: US 12,231,012 B2
(45) Date of Patent: Feb. 18, 2025

(54) AXIAL FLUX ELECTRICAL MACHINE

(71) Applicant: SAIETTA GROUP PLC, Upper Heyford (GB)

(72) Inventor: Christopher Roger Lines, Upper Heyford (GB)

(73) Assignee: Exedy Clutch Europe Limited, Runcorn (GB)

(*) Notice: Subject to any disclaimer, the term of this patent is extended or adjusted under 35 U.S.C. 154(b) by 359 days.

(21) Appl. No.: 17/424,984

(22) PCT Filed: Jan. 29, 2020

(86) PCT No.: PCT/GB2020/050213
§ 371 (c)(1),
(2) Date: Jul. 22, 2021

(87) PCT Pub. No.: WO2020/157503
PCT Pub. Date: Aug. 6, 2020

(65) Prior Publication Data
US 2022/0094230 A1    Mar. 24, 2022

(30) Foreign Application Priority Data
Jan. 29, 2019   (GB) .................................. 1901192

(51) Int. Cl.
*H02K 3/47*   (2006.01)
*H02K 1/2798*   (2022.01)
(Continued)

(52) U.S. Cl.
CPC ............. *H02K 3/47* (2013.01); *H02K 1/2798* (2022.01); *H02K 15/061* (2013.01); *H02K 21/24* (2013.01)

(58) Field of Classification Search
CPC ...... H02K 3/47; H02K 1/2798; H02K 15/061; H02K 21/24; H02K 1/182; H02K 3/04;
(Continued)

(56) References Cited

U.S. PATENT DOCUMENTS 3,292,024 A * 12/1966 Kober ...................... H02K 3/04
310/201
3,428,840 A *  2/1969 Kober .................... H02K 9/227
310/55

(Continued)

FOREIGN PATENT DOCUMENTS

| CN | 103493344 A | 1/2014 |
| CN | 204392045 | 6/2015 |

(Continued)

OTHER PUBLICATIONS

PCT Search Report and Written Opinion prepared for PCT/GB2020/050213, completed Apr. 2, 2020.

(Continued)

*Primary Examiner* — Ahmed Elnakib
(74) *Attorney, Agent, or Firm* — Barnes & Thornburg LLP

(57) ABSTRACT

A stator (10) for an axial flux electrical machine (100), an axial flux machine (100) that includes the stator (10), and a method (500) of manufacturing a stator (10) are provided. The conductive coils (12) which form the stator (10) provide a structure which includes spaces (131a, 131b, 131c, 132a, 132b) for flux guides (30), which improves ease of stator manufacture. It also allows for a high number of slots per pole per phase, which provides a more sinusoidal back-EMF. The stator (10) comprises a plurality of circumferentially distributed conductive coils (12), each of the plurality of conductive coils configured to be connected to a phase of a multi-phase power supply and comprising at least one pair of active sections (121a, 121b), wherein each active section (Continued)

(121a, 121b) extends in a generally radial direction substantially perpendicular to an axis of rotation of the electrical machine (100), wherein the generally radially extending active sections (121a, 121b) of each pair are pitched apart in a circumferential direction, and wherein circumferentially adjacent conductive coils (12) circumferentially overlap to define a space of a first type (131a, 131b, 131c) for receiving a flux guide (30), each space of the first type (131a, 131b, 131c) being a circumferential space between two adjacent active sections of two different coils.

20 Claims, 21 Drawing Sheets

(51) Int. Cl.
*H02K 15/06* (2006.01)
*H02K 21/24* (2006.01)

(58) Field of Classification Search
CPC ........ H02K 5/04; H02K 21/026; H02K 15/02; H02K 1/2793; H02K 1/2796; H02K 37/08; H02K 37/125
See application file for complete search history.

(56) References Cited

U.S. PATENT DOCUMENTS

| | | | | |
|---|---|---|---|---|
| 6,768,239 | B1* | 7/2004 | Kelecy | H02K 3/04 310/179 |
| 7,098,566 | B2 | 8/2006 | Rajasingham et al. | |
| 10,447,103 | B2* | 10/2019 | Hunstable | H02K 1/02 |
| 10,951,075 | B2 | 3/2021 | Woolmer | |
| 2002/0175588 | A1* | 11/2002 | Rajasingham | H02K 3/04 310/179 |
| 2005/0035672 | A1 | 2/2005 | Ward et al. | |
| 2006/0119215 | A1* | 6/2006 | Ritz, Jr. | H02K 21/18 310/268 |
| 2008/0042515 | A1* | 2/2008 | Butterfield | H02K 11/33 310/156.36 |
| 2013/0002066 | A1* | 1/2013 | Long | H02K 1/2795 310/156.01 |
| 2015/0150296 | A1* | 6/2015 | Cugnasca | A23L 2/02 426/599 |
| 2016/0329766 | A1* | 11/2016 | Tanaka | H02K 3/12 |
| 2017/0012480 | A1 | 1/2017 | Woolmer | |

FOREIGN PATENT DOCUMENTS

| | | | |
|---|---|---|---|
| CN | 107689699 | A | 2/2018 |
| CN | 106374702 | | 7/2018 |
| JP | 2011250651 | A | 12/2011 |
| JP | 2011254680 | A | 12/2011 |
| JP | 5066863 | | 11/2012 |
| JP | 2013162677 | A | 8/2013 |
| WO | WO1997044880 | | 11/1997 |
| WO | WO 01/47089 | * | 6/2001 |
| WO | WO2011139396 | | 11/2011 |

OTHER PUBLICATIONS

United Kingdom Examination Report and Search Report prepared for 1901192.3 , completed Jul. 18, 2019.
Communication pursuant to Article 94(3) EPC for European Patent Application No. 20703818.3, dated Jan. 4, 2024 (6 pages).
Notice of Reasons for Refusal for Japanese Patent Application No. 2021-544466, dated Dec. 5, 2023, and its English translation (8 pages).
Office Action for Canadian Patent Application No. 3,128,290, dated Mar. 27, 2024 (5 pages).
Notice of Opinion Submission for Korean Patent Application No. 10-2021-7027609, dated Mar. 16, 2024, and its English translation (14 pages).
Search Report in Related Chinese Application No. 2020800049666 dated May 24, 2023, 3 pages.
Search Report in Related Chinese Application No. 2020800049666 dated May 20, 2024, 2 pages.
Second examination opinion notice in Related Chinese Application No. 2020800049666 dated May 24, 2023, 10 pages.

* cited by examiner

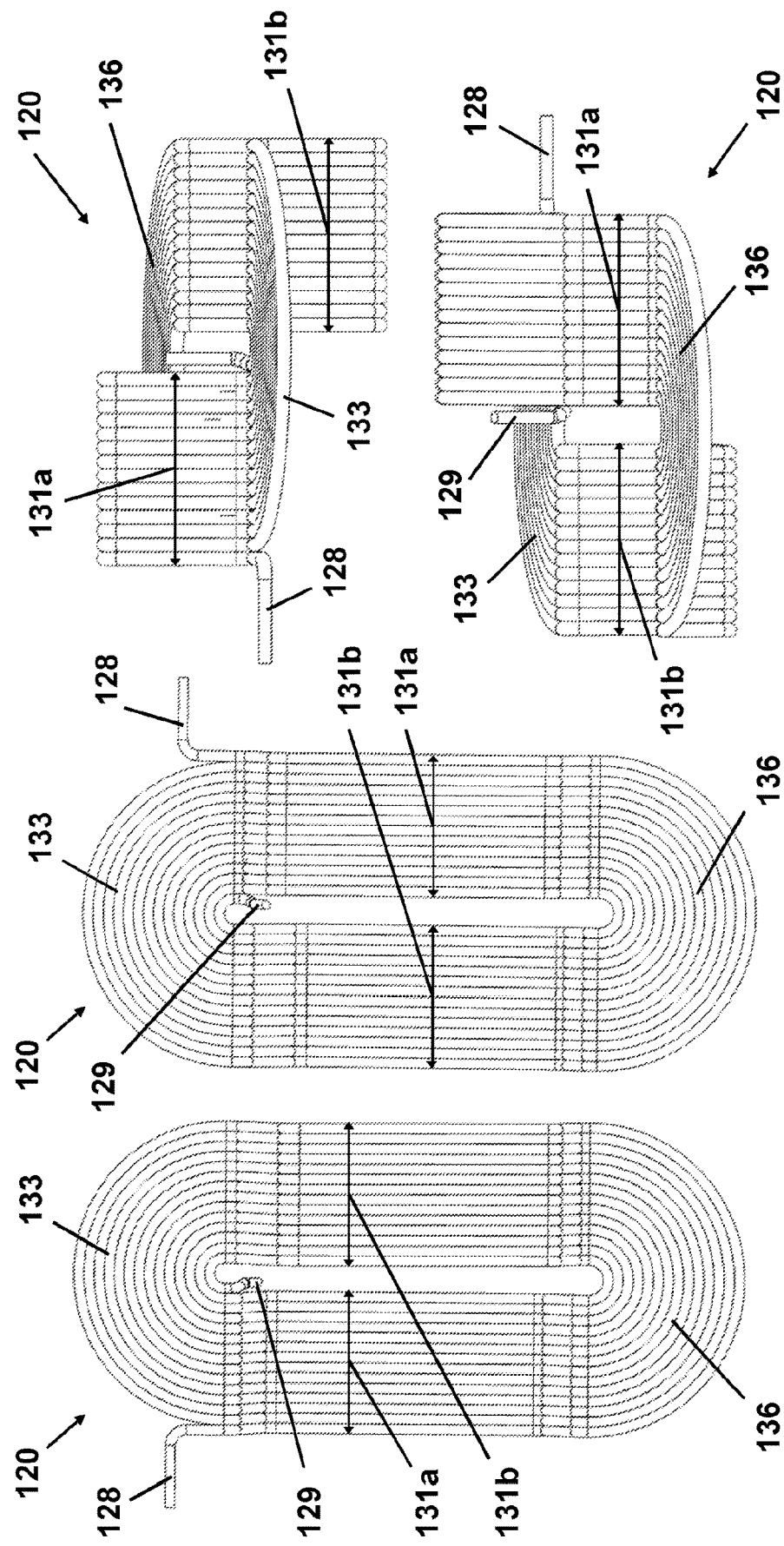

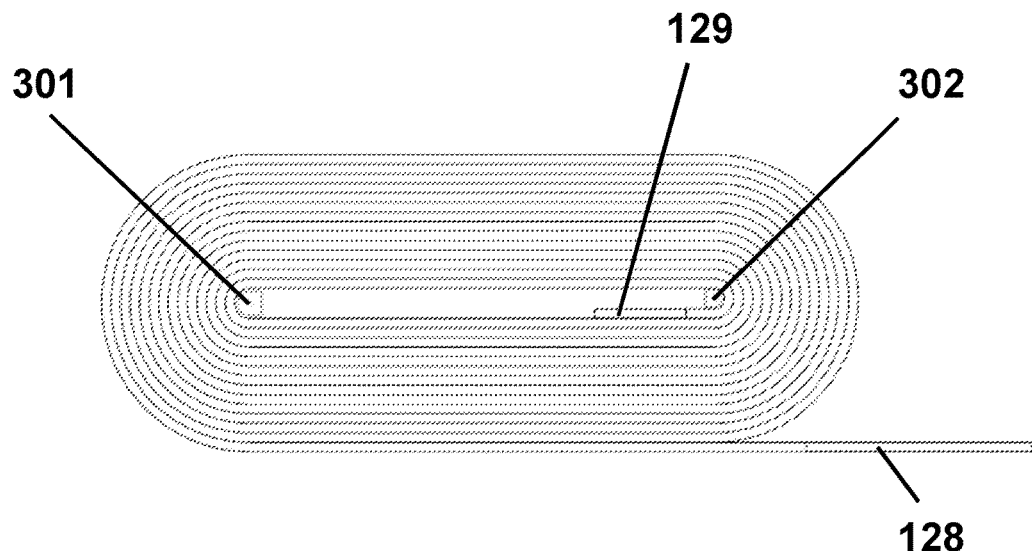
FIG. 5G
FIG. 5H
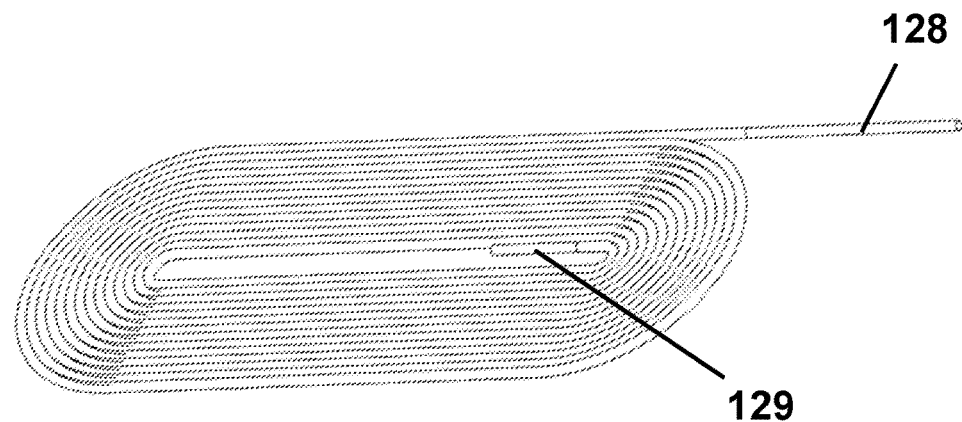
FIG. 5I

AXIAL FLUX ELECTRICAL MACHINE

CROSS-REFERENCE TO RELATED APPLICATIONS

This application is the U.S. national phase of PCT/GB2020/050213, filed on Jan. 29, 2020, which claims the benefit of United Kingdom Patent Application Number 1901192.3, filed on Jan. 29, 2019, the entire disclosures of both of which are hereby incorporated by reference herein.

TECHNICAL FIELD

The invention relates to axial flux electrical machines, and in particular to a stator assembly for an axial flux electrical machine.

BACKGROUND

Electrical machines, including electric motors and electric generators, are already very widely used. However, concerns over our reliance on and the pollution caused by the fossil fuels that power internal combustion engines is creating political and commercial pressures to extend the use of electrical machines to new applications, and to expand their use in existing ones. Electrical machines are increasingly being used in vehicles, such as electric cars, motorbikes, boats and aircraft. They are also used in energy generation applications, for example generators in wind turbines.

In order to meet the needs of these applications, it will be necessary to design electrical machines that have both suitable performance properties, such as speed and torque, and high efficiency. The efficiency of electrical machines is critically important in almost all applications: it can, for example, both increase an electric vehicle's range and decrease the required battery capacity. Decreasing the required battery capacity can in turn decrease the weight of the vehicle, which leads to further efficiency gains.

One known type of electrical machine is the axial flux machine. As the name suggests, the direction of the lines of magnetic flux that are cut during the operation of an axial flux machine is parallel to the axis of rotation of the machine. This is in contrast to radial flux machines, in which the direction of the lines of magnetic flux that are cut during the operation of the machine is perpendicular to the rotation axis of the machine. While radial flux machines are more common, axial flux machines have been used for some applications where their form factor (a relatively small axial extent) and performance properties (such as a high torque to weight ratio) are appreciated.

One example of a yokeless axial flux machine which utilizes a concentrated winding arrangement is described in International Patent Application with publication number WO 2018/015293 A1. The stator assembly of the axial flux machine includes circumferentially distributed discrete stator teeth which each have a ferromagnetic material around which there is an electrical winding. This is commonly referred to as a yokeless and segmented armature machine. Radially-inward-extending elongated portions of the stator housing are provided for cooling and to provide a structure for receiving the stator teeth. While axial flux machines of this kind are able to achieve high efficiencies, it would be desirable to improve the efficiency, especially over a broader range of operating parameters. Further, even though the inwardly radially extending elongated portions of the housing provide some structure for receiving the discrete stator teeth, there are difficulties associated with positioning and bonding each stator tooth accurately into the stator housing, and each stator tooth must be wound around a bobbin-like structure that contains the ferromagnetic material. It would be desirable to provide a stator which can be more easily and accurately assembled.

SUMMARY OF THE INVENTION

Embodiments described herein provide a conductive coil and a stator for an axial flux machine comprising a plurality of conductive coils which provide for high machine efficiencies, ease of manufacture and good heat conduction from the coils to the stator housing which aids cooling.

Throughout this disclosure, unless otherwise qualified, terms such as "radial", "axial", "circumferential" and "angle" are used in the context of a cylindrical polar coordinate system (r, $\vartheta$, z) in which the direction of the axis of rotation of the electrical machine is parallel to the z-axis. That is, "axial" means parallel to the axis of the rotation (that is, along the z-axis), "radial" means any direction perpendicular to the axis of rotation, an "angle" is an angle in the azimuth direction $\vartheta$, and "circumferential" refers to the azimuth direction around the axis of rotation.

Terms such as "radially extending" and "axially extending" should not be understood to mean that a feature must be exactly radial or exactly parallel to the axial direction. To illustrate, while it is well-known that the Lorentz force experienced by a current carrying conductor in a magnetic field is at a maximum when the direction of the current is exactly perpendicular to the direction of the magnetic flux, a current carrying conductor will still experience a Lorentz force for angles less than ninety degrees. Deviations from the parallel and perpendicular directions will therefore not alter the underlying principles of operation.

The invention is defined in the independent claims to which reference should now be made. Preferred features are set out in the dependent claims.

According to an aspect of the claimed invention, there is provided a stator for an axial flux electrical machine. The stator comprises a plurality of circumferentially distributed conductive coils. Each of the plurality of conductive coils is configured to be connected to a phase of a multi-phase power supply and comprises at least one pair of active sections. Each active section extends in a generally radial direction substantially perpendicular to an axis of rotation of the electrical machine. The generally radially extending active sections of each pair are pitched apart in a circumferential direction. Circumferentially adjacent conductive coils circumferentially overlap to define spaces of a first type for receiving a flux guide. Each space of the first type is a circumferential space between two adjacent active sections of two different coils.

The circumferential spaces are, like the active sections, substantially radially extending, and may be elongate in the radial direction.

The conductive coils of such a stator form a structure into which flux guides, such as lamination packs, can be placed. This allows for the stator to be manufactured quickly, and also with a high degree of accuracy which improves the efficiency of the electrical machine. Additionally, the number of flux guides and, correspondingly, slots per pole per phase of the stator can be readily increased and readily scales with the radius of the electric machine. Increasing the number of slots per pole per phase can make the circumferential, spatial magnetic flux density within the stator and the two machine airgaps more sinusoidal, with lower harmonic distortion. For sinusoidally varying phase currents, the average torque that is produced by the electrical machine results more from the interaction of the fundamental magnetic field components and not from the harmonic components. This is advantageous because harmonic components in the circumferential spatial magnetic flux density result in larger eddy currents in the permanent magnets of the rotors, which causes higher losses and increased heating. Furthermore, any additional harmonic components in the winding magnetomotive force distribution can cause increased losses in the flux guides.

In use, current flows in opposite radial directions along the active sections that form a pair of active sections of a coil.

Each conductive coil may comprise a plurality of pairs of active sections connected to each other in series. Adjacent pairs of active sections may circumferentially overlap so as to define a space of a second type for receiving a flux guide. The space of the second type may be a circumferential space between two adjacent active sections of the same coil but different pairs of active sections of the coil. The circumferential space is, like the active sections defining, substantially radially extending and may be elongate in the radial direction. Each additional pair of active sections per coil increases the number of slots per pole per phase by one, which can reduce losses and therefore improve efficiency. Advantageously, the number of active sections per coil can be scaled with the radius of machine.

The number of pairs of active sections may be an integer multiple of two. Using an integer multiple of two pairs of active sections readily allows each coil to be made from a plurality of identical conductive elements, which reduces manufacturing costs.

The plurality of pairs of active sections that make up one coil may be integrally formed or formed by connecting, in series, a plurality of separate elements which each comprise one pair of active sections. The connection may be made using a ferrule, by brazing or by welding, for example. Separate elements may be formed by winding, bonding and forming conductors which can be performed using known winding techniques that are relatively cheap to implement. Integrally forming elements may be expensive but may also allow for more complex coil topologies that cannot be achieved or are difficult to achieve by usual winding techniques. Furthermore, with integrally-formed elements, the number of constituent parts of the stator is reduced.

The stator may further comprise flux guides, such as electric steel laminations, positioned in the first and/or second types of spaces. Flux guides channel the flux axially between corresponding magnetic poles on opposing rotors. These flux guides may have high magnetic permeability in at least the axial direction and thus, for a specific arrangement of permanent magnets, increases the magnetic flux density in the stator.

The plurality of conductive coils may be provided in a plurality of groups, each group corresponding to one pole of the stator. Circumferentially adjacent conductive coils may be configured to be connected to different phases of the multi-phase supply such that, for an N-phase power supply, the stator comprises a plurality of groups of N conductive coils, each group of N conductive coils comprising one coil for each phase of the N-phase supply, each group corresponding to one pole of the stator.

The stator may be configured so that, in use, current flows in the same direction along adjacent active sections separated by one of the second type of spaces for a flux guide. This avoids the current flowing in these adjacent active sections being counter-productive to torque production.

The active sections of each pair of active sections may be axially offset from each other. Axially offsetting the active sections facilitates stacking of the coils in the axial and circumferential direction, which provides for flexibility in the span (pitch) between each pair of active sections and also improves the structural rigidity of the complete winding owing to the interlocking nature of the coils.

Each active section may comprise a plurality of winding turn portions stacked parallel to the axis of rotation such that a cross-section perpendicular to the radial direction of each active section is elongate with a major dimension parallel to the axis of rotation. Axially stacking insulated winding turns mitigates skin and proximity effects in the active sections. This is because the cross-section of each winding turn is smaller and, given that the winding turns are series connected, the current is deterministically governed to flow over the full axial extent of each active section. This reduces heating, since the current is spread more evenly through the conductive cross-section and improves flux linkage.

Each active section may be only a single winding turn wide. Alternatively, each active section may be a plurality of winding turns wide. That is, each active section may comprise a plurality of circumferentially stacked winding turn portions. If each active section does comprise a plurality of circumferentially stacking winding turn portions, the number of circumferentially stacked winding turn portions is preferably less than the number of axially stacked winding turn portions, such that the major dimension of the cross-section of the coil that is perpendicular to the radially extending direction of the active section is parallel to the axis of rotation. For example, the active sections may be only two winding turn portions wide but comprise more than two winding turn portions in the axial direction. For example, the ratio of the number of axially stacked winding turn portions to the number of circumferentially stacked winding turn portions may be greater or equal to three, preferably greater or equal than five, more preferably greater or equal to seven. A coil that is more than one winding turn portion wide increases the overall length of conductor, which in turn increases the impedance of the coil. A higher impedance may allow the use of a controller with a lower switching rate, which may in some cases reduce costs.

The winding turn portions of the first and second generally radially extending active sections may have proximal ends located at an inner radius and distal ends located at an outer radius. The proximal ends of the winding turn portions may be connected by inner loop sections and the distal ends may be connected by outer loop sections such that, in use, current flows in opposite radial directions along the pair of radially extending active sections.

The outer loop sections may be configured to form an outer part of the coil that is substantially parallel to the axis of rotation. An axially parallel part of the coil can be axially inserted into an aperture in a stator housing, which improves ease of stator manufacture. Further, the extended nature of the part of the coil provides a greater surface area for mechanical locking of the coils and cooling at the outside circumference of the stator.

The stator may further comprise a stator housing that comprises circumferentially distributed and axially extending apertures for receiving the outer parts of the conductive coils that are substantially parallel to the axis of rotation. As noted above, this provides for easier and more accurate manufacture and improved heat transfer from the conductive components of the stator through the stator housing.

Each outer loop section may have any shape but may preferably be substantially semi-circular or rectangular such that the outer part of the coil is a half-disk or rectangular surface. The surface may also be curved, for example involute-shaped. These surfaces create a large surface area yet also require a relatively limited length of conductor for a given axial extent of the coil, which reduces material costs.

The outer loop sections may be configured to form substantially involute parts of the coil. Involute parts, which maintain a substantially constant gap between adjacent conductive elements, provide for a radially-interlocking arrangement of circumferentially-distributed coils. There may be two substantially involute outer parts of the coil, connecting the outer part of the coil to the two active sections.

The inner loop sections may be configured to form an inner part of the coil that is substantially parallel to the axis of rotation. Being substantially parallel to the axis of rotation, the inner part takes up as little as circumferential space as possible. This is significant as physical space is at a premium at the inner radius of the stator.

The inner loop sections may have any shape but may preferably be substantially semi-circular or rectangular such that the inner part is a half-disk or rectangular surface. The surface may also be curved, for example involute-shaped. These shapes require a relatively limited length of conductor to implement, which reduces material costs.

The inner loop sections may be configured to form a substantially involute part of the coil. Involute parts provide a radially-interlocking arrangement for circumferentially-distributed coils. There may be two substantially involute inner parts of the coil, connecting the inner part of the coil to the two active sections.

The stator may further comprise connecting means for connecting the conductive coils to the multi-phase power supply. The connecting means may be provided axially above a plane that is perpendicular to the axis of rotation and axially above the conductive coils and/or may be provided below a plane that is perpendicular to the axis of rotation and axially below the conductive coils. Positioning the connecting means above and/or below the coils allows for easy connection of the coils to the connecting means, and also means that the connections may be accessible even after impregnation of the stator assembly. This prevents a faulty connection from rendering the entire stator unusable.

Each of the plurality of conductive coils may comprise a pair of connection portions that extend substantially parallel to the axis of rotation for connecting the conductive coils to the connecting means. The connection portions may extend in the same parallel direction or in opposite parallel directions. Parallel extending connection portions allow for very simple connection of the coils to the connecting means.

The connecting means may comprise a plurality of busbars, which may be annular, or a plurality of busbar sections.

For each phase of the multi-phase power supply, every second coil of the stator that is connected to said phase may be connected to a common busbar. In this way, the winding may be divided into two interleaved portions that connect half of the total number of coils per phase to one of two phase busbars.

A yokeless axial flux electrical machine comprising any of the stators described above is also provided.

The yokeless axial flux electrical machine may further comprise a pair of opposed rotors disposed on opposite sides of the stator, each rotor comprising a plurality of circumferentially distributed permanent magnets defining a pole pitch of the electrical machine. The angle by which each pair of active sections is pitched apart may be different than the pole pitch of the electrical machine defined by the permanent magnets. While the angle by which each pair of active sections is pitched apart may be the same as the pole pitch, using a different angle facilitates long-chording or short-chording of the winding.

The angle by which each pair of active sections may be pitched apart is less than the pole pitch. Using a smaller angle allows short-chording, which can be used to further reduce harmonics in the stator field.

One of the pair of opposed rotors may be shared between the stator and a second, axially aligned, stator.

According to another aspect of the claimed invention, there is provided a method of manufacturing a stator of an axial flux electrical machine. The method comprises positioning a plurality of conductive coils in a stator housing so that the plurality of coils are circumferentially distributed around the stator housing. The conductive coils are positioned so that circumferentially adjacent conductive coils circumferentially overlap and thereby define spaces of a first type receiving a flux guide. Each space of the first type is a circumferential space in the region where two coils overlap. The method further comprises positioning flux guides in the spaces of the first type.

The conductive coils of such a stator form a structure into which flux guides, such as lamination packs, can be placed. This allows for the stator to be manufactured quickly, and also with a high degree of accuracy which improves the efficiency of the electrical machine.

Each conductive coil may comprise a plurality of pairs of active sections connected to each other in series. Adjacent pairs of active sections may circumferentially overlap so as to define a space of a second type for receiving a flux guide. The space of the second type may be a circumferential space between two adjacent active sections of the same coil but different pairs of active sections of the coil. In this case, the method may further comprise positioning flux guides in the spaces of the second type. Not only does this provide additional structure for placing flux guides, but it allows for the manufacture of machines with a higher number of slots per pole per phase. As explained above, this can reduce harmonics in the stator field and improve machine efficiency.

The stator housing may comprise a plurality of circumferentially distributed and axially extending apertures. In this case, positioning the plurality of conductive coils in the stator housing may comprise, for each respective conductive coil, positioning an axially extending part of the respective coil into one of the axially extending apertures. This increases ease of assembly, accuracy of assembly, mechanical locking and, in use, cooling and efficiency.

The method may further comprise impregnating at least part of the stator in a bonding compound, such as a resin. This strengthens the stator assembly, protecting it against mechanical and electromagnetic forces it experiences during use. Means for connecting the coils to the power supply may not be impregnated with the bonding compound, advantageously allowing access to the connections after impregnation.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWINGS

Embodiments of the invention will now be further described by way of example only and with reference to the accompanying figures in which:

FIG. 5C shows two side views of the conductive coil element of FIGS. 5A and 5B;

FIG. 5D shows front-on and rear-on views of the conductive coil element of FIGS. 5A-5C;

FIG. 5G is a plan view of a conductive element illustrating how the conductive element may be wound in a flat plane;

FIG. 5H is a side view of the conductive element illustrated in FIG. 5G;

FIG. 5I is a perspective view of the conductive element illustrated in FIGS. 5G and 5H;

Like reference numbers are used for like elements throughout the description and figures.

DETAILED DESCRIPTION

An embodiment of the invention will now be described with reference to an axial flux motor 100. While a motor 100 is described, it should be appreciated that the invention could equally be implemented in other types of axial flux electrical machines such as generators.

Overview of an Axial Flux Machine

Figure 1A:
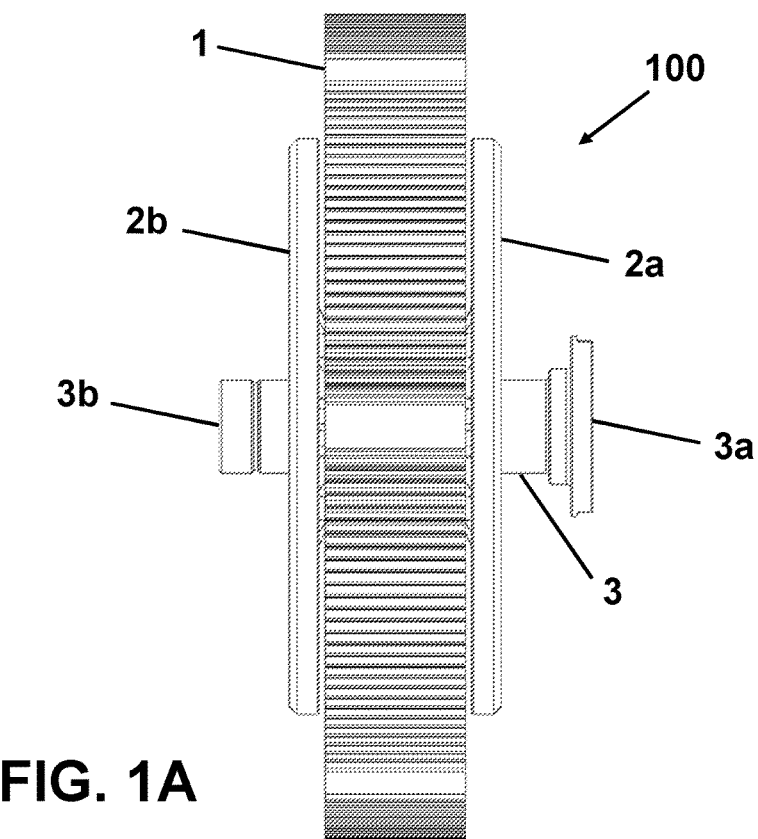
FIG. 1A is a side view of an axial flux machine showing a stator assembly, rotors and a shaft.
Figure 1B:
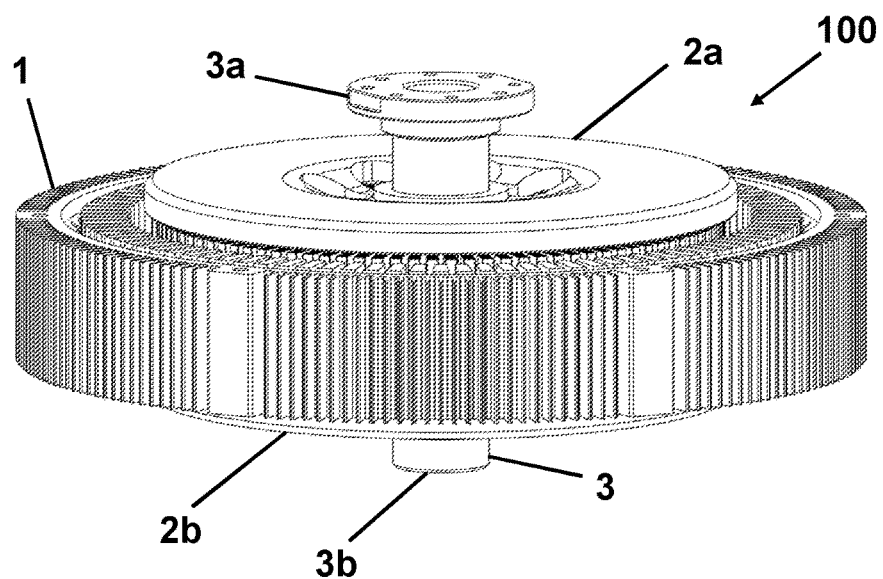
FIG. 1B is a perspective view of the axial flux machine of FIG. 1A.

FIG. 1A and FIG. 1B illustrate the main components of an axial flux motor 100. The axial flux motor 100 includes a stator assembly 1, two rotors 2a, 2b disposed on opposite sides of the stator assembly 1, and a shaft 3. The shaft includes a drive end 3a and non-drive end 3b. The rotors 2a, 2b are fixedly mounted to the shaft 3. In use, the stator 1 of the axial flux motor 100 remains stationary and the rotors 2a, 2b and shaft 3 rotate together relative to the stator 1. It should be appreciated that various components typically present in a motor 100, such as rotor cover plates and means for connecting the stator to a source of power, have been omitted from FIGS. 1A and 1B for clarity.

While FIGS. 1A-1B show two rotors 2a, 2b and a single stator 1, it will be appreciated that other configurations are possible. For example, one of the rotors 2a, 2b could be shared between two axially-aligned stators. That is, there may be two stators and three rotors, with one of the three rotors shared between the two stators.

Figure 2A:
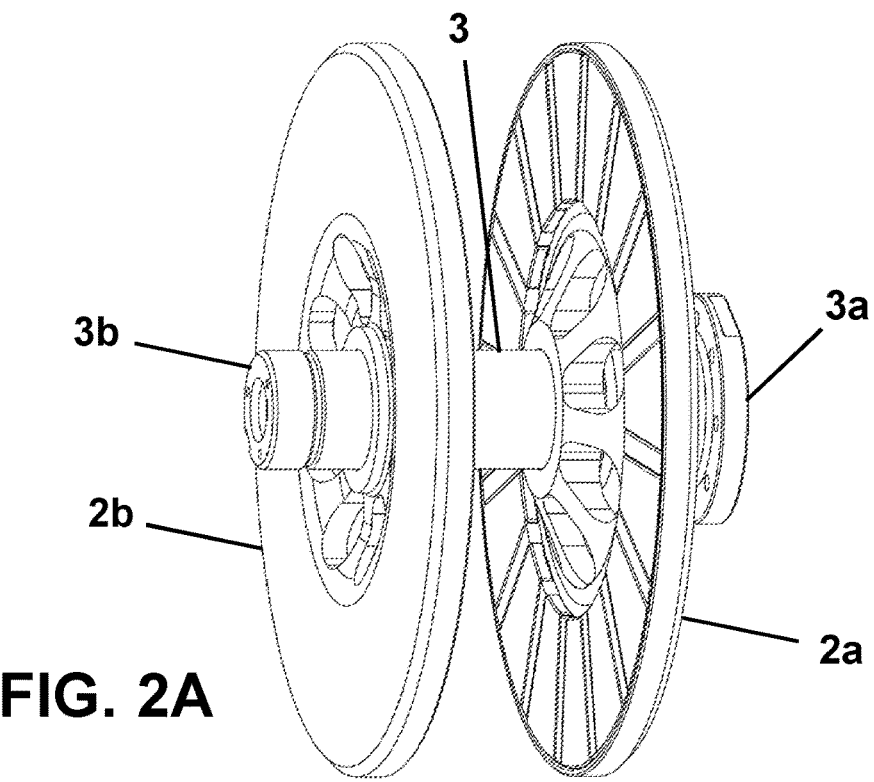
FIG. 2A is a perspective view of the rotors and shaft of the axial flux machine of FIGS. 1A-1B.
Figure 2B:
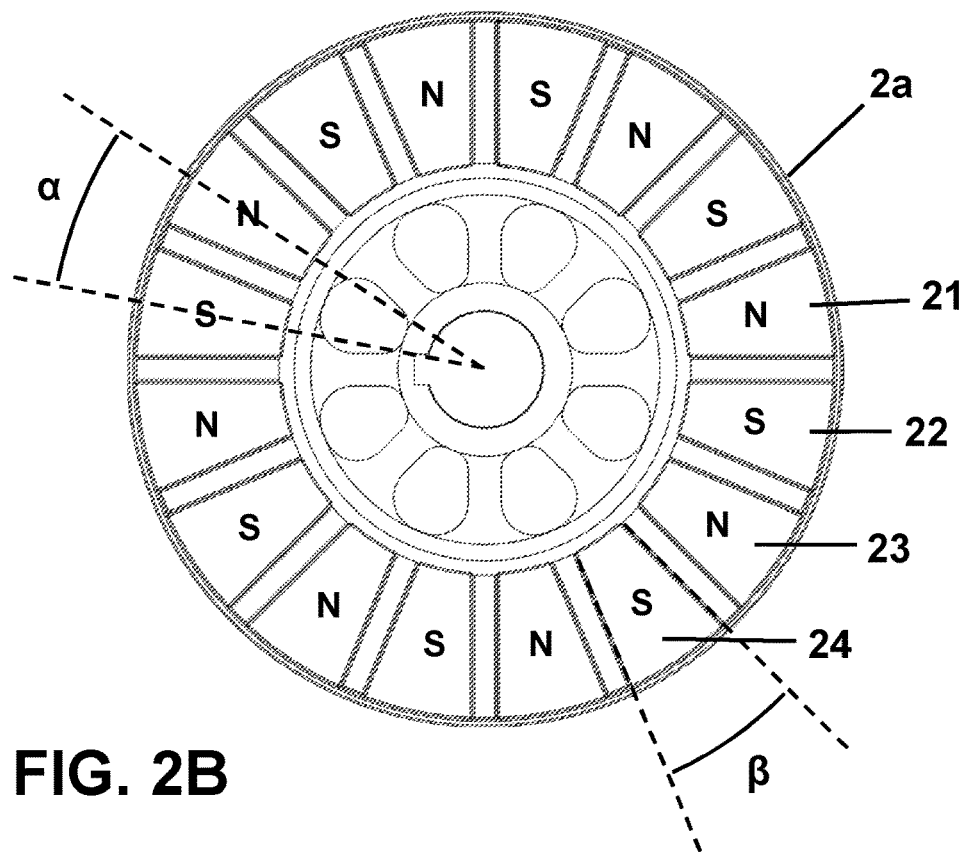
FIG. 2B is a plan view of one rotor of the axial flux machine of FIGS. 1A-B and 2A, more clearly showing the permanent magnets of the rotor.

FIG. 2A and FIG. 2B illustrate the rotors 2a, 2b and the shaft 3 of the motor 100 without the stator assembly 1. As is particularly clear from FIG. 2B, each rotor 2a, 2b includes a plurality of circumferentially distributed permanent magnets 21, 22, 23, 24. The magnets 21, 22, 23, 24 are, for example, rare-earth magnets such as NdFeB magnets. Circumferentially adjacent magnets, such as permanent magnets 21 and 22 have opposite polarity. That is, each north pole 23 is circumferentially adjacent to two south poles 22, 24, and each south pole 22 is circumferentially adjacent to two north poles 21, 23.

Although it cannot be seen in FIGS. 2A and 2B, the rotors 2a, 2b are mounted such that opposing permanent magnets have opposite poles. That is, a north pole on rotor 2a faces a south pole on rotor 2b and vice versa. Consequently, the magnets of the two rotors 2a, 2b generate a magnetic field with axial lines of magnetic flux between the two rotors 2a, 2b.

As will be understood by those skilled in the art, the stator assemblies 1 described herein are yokeless but not ironless. A yoke is an additional structural element present in some stators for guiding lines of magnet flux between opposite poles of the rotor magnetic field. That is, the yoke completes the magnetic circuits within the stator. Since the axial flux machines 100 described herein utilize a pair of opposed rotors 2a, 2b whose opposed permanent magnets have opposite polarity, there is no need for a yoke to complete the magnetic circuits because the flux is unidirectional. Having a yokeless stator reduces the overall weight of the axial flux machine, which is greatly beneficial in many practical applications. In addition, it improves efficiency since there are no losses attributed to a varying flux density in a yoke region.

The circumferential (angular) separation $\alpha$ of the centres of two adjacent permanent magnets 21, 22 of the rotor 2a, 2b defines the pole pitch of the axial flux motor 100. It is noted that the average span of the permanent magnets $\beta$ may be the same as or less than the pole pitch $\alpha$ of the motor 100. In FIGS. 2A-2B, adjacent magnets are separated by a non-magnetic spacer and so the average span $\beta$ of the permanent magnets 21-24 is less than the pole pitch $\alpha$ of the motor 100. In an example, $\beta$ is approximately ¾ of $\alpha$. The ratio of $\beta$ to $\alpha$ can be chosen to reduce the circumferential, spatial harmonic distortion of the permanent magnet flux density in the stator 1. As will be appreciated, it is not essential to provide non-magnetic spacers to enable the span $\beta$ of the permanent magnets 21-24 to be less than the pole pitch $\alpha$ of the motor 100. For example, the permanent magnets 21-24 can be affixed to the rotor using adhesive, or the like, in their required spaced apart positions.

The rotors 2a, 2b illustrated in FIGS. 2A-2B have sixteen circumferentially distributed permanent magnets 21-24 and therefore have sixteen poles. However, this is merely an example and in practice there may be greater or fewer than sixteen poles, partly depending on the intended application. For example, the poles typically exist in pairs (so there is typically an even number of poles) and the number of poles is to some extent limited by the radius of the rotors 2a, 2b, which will depend on the size of motor suitable for the intended application. The rotor 2a, 2b could, for example, have eight or thirty-two poles.

Figure 3:
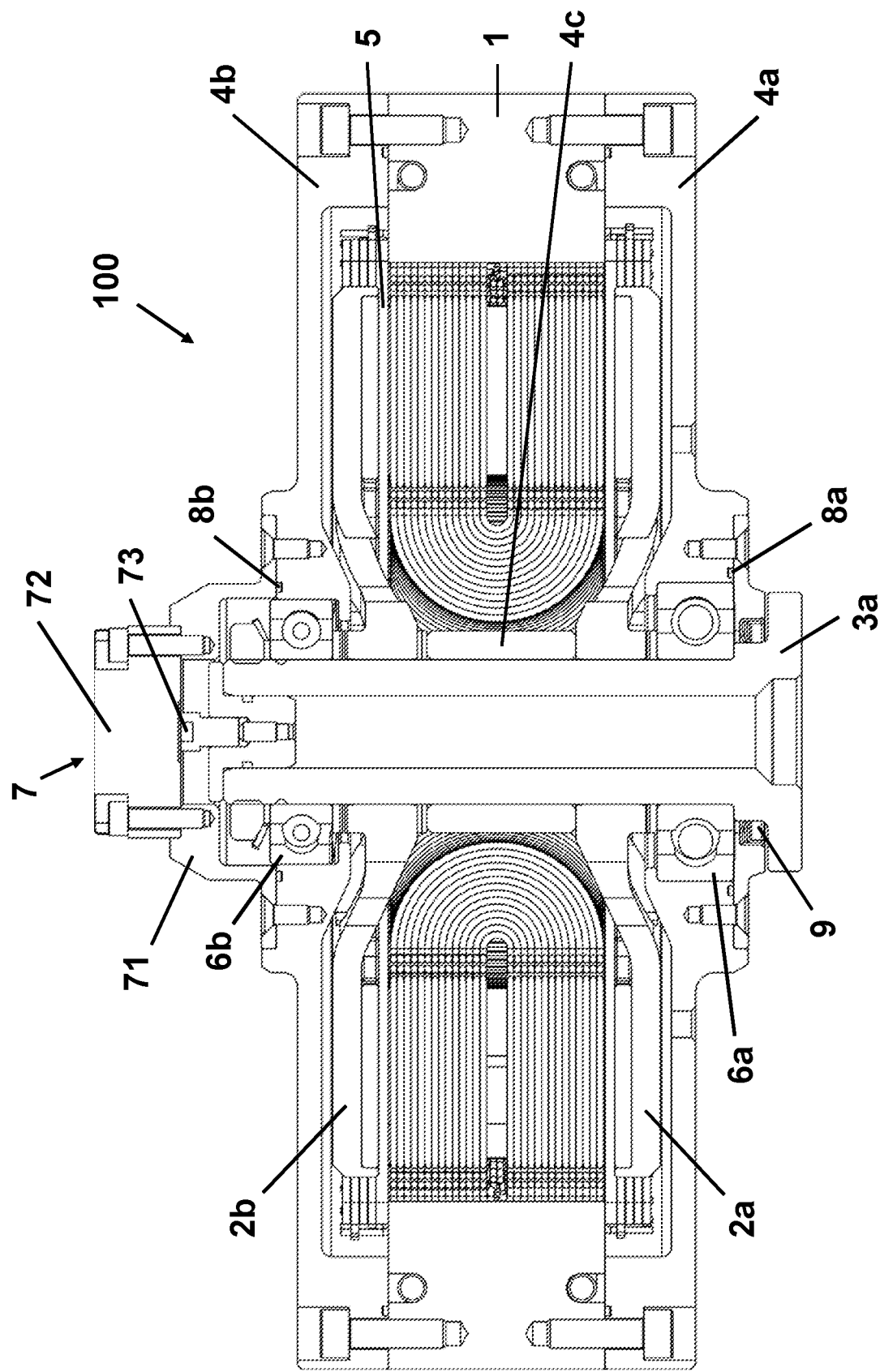
FIG. 3 is a cross-sectional side view of an axial flux machine, showing additional detail not visible in FIGS. 1A-1B and 2A-2B.

Turning to FIG. 3, this shows a cross-sectional view of the axial flux motor 100 of FIGS. 1-2 with additional detail. As the inventions described herein principally concern the conductive components 10 of the stator assembly 1, which will be described in more detail below with reference to FIGS. 4-12, only a brief overview of the components of FIG. 3 will be provided. Those skilled in the art will be familiar with the components of an axial flux machine such as an axial flux motor 100, and will also appreciate that not all of the features shown in FIG. 3 are essential to an axial flux machine, and that features which are present can be implemented in a variety of different ways.

In addition to the stator 1, drive-end rotor 2a, non-drive-end rotor 2b and shaft 3, FIG. 3 shows the drive-end and non-drive-end rotor cover plates 4a, 4b which enclose the rotors 2a, 2b and generally seal the motor 100 to prevent the ingress of outside material. Rotor spacer ring 4c spaces apart the rotors 2a, 2b. O-ring seals 8a, 8b and dynamic seal 9 further seal the internals of the motor 100. Rotation of the rotors 2a, 2b is assisted by the drive-end and non-drive end bearings 6a, 6b, which maintain the airgaps 5 between the permanent magnets of the rotors 2a, 2b and the stator 1. An encoder assembly 7 that includes an encoder mount 71, an on-axis position encoder 72 and an associated encoder sensor magnet 73 is also shown.

Conductive Coils and Stator

The conductive components 10, including the conductive coils 12, of a stator assembly 1 will now be described with reference to FIGS. 4-12. It should be appreciated that although specific examples are described, with specific numbers of stator poles 11, conductive coils 12 and current phases, this is not intended to limit the scope of the claims.

Figure 12A:
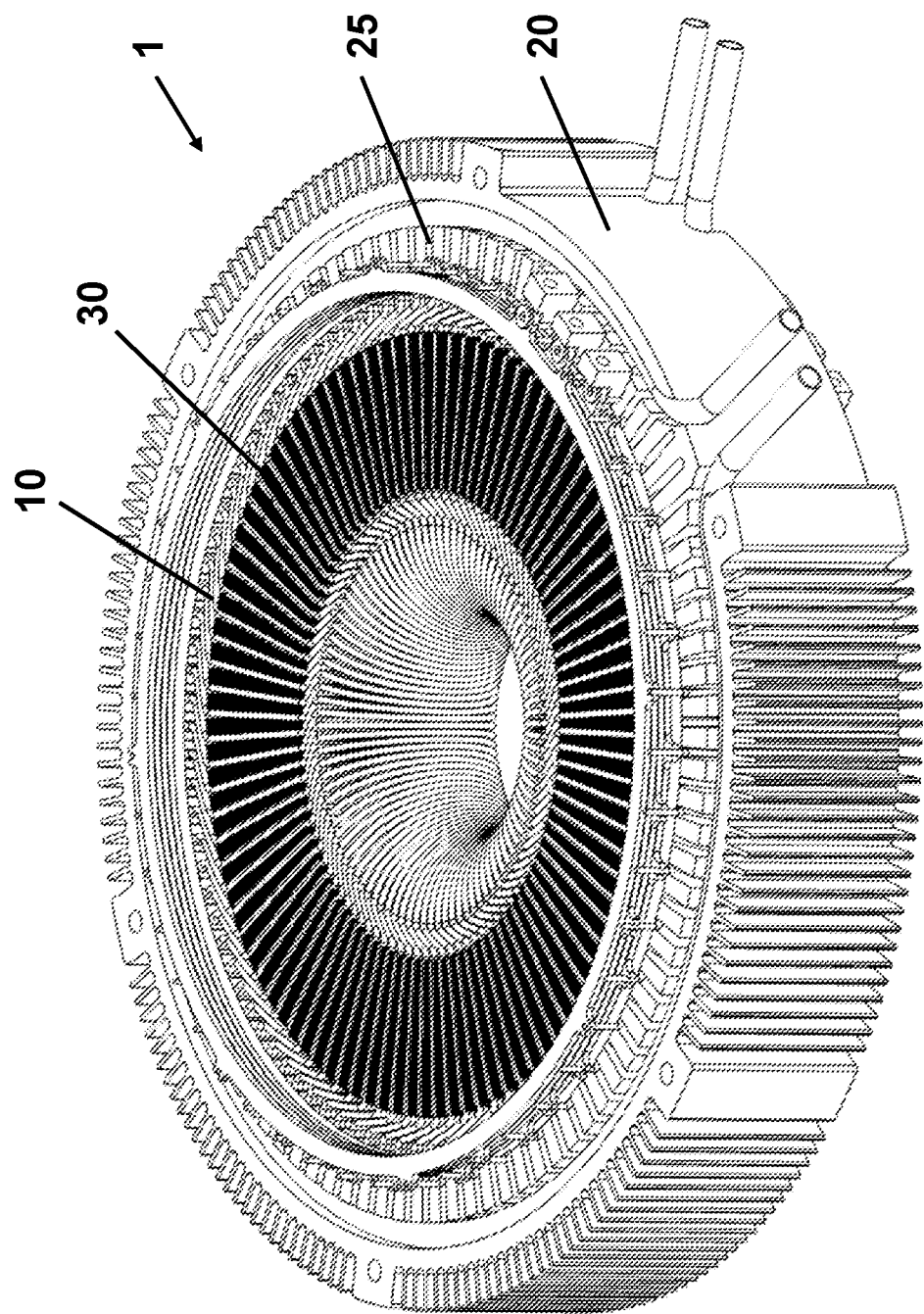
FIG. 12A is a perspective view of a stator assembly, including a stator housing that houses the conductive coils of the stator assembly.
Figure 12B:
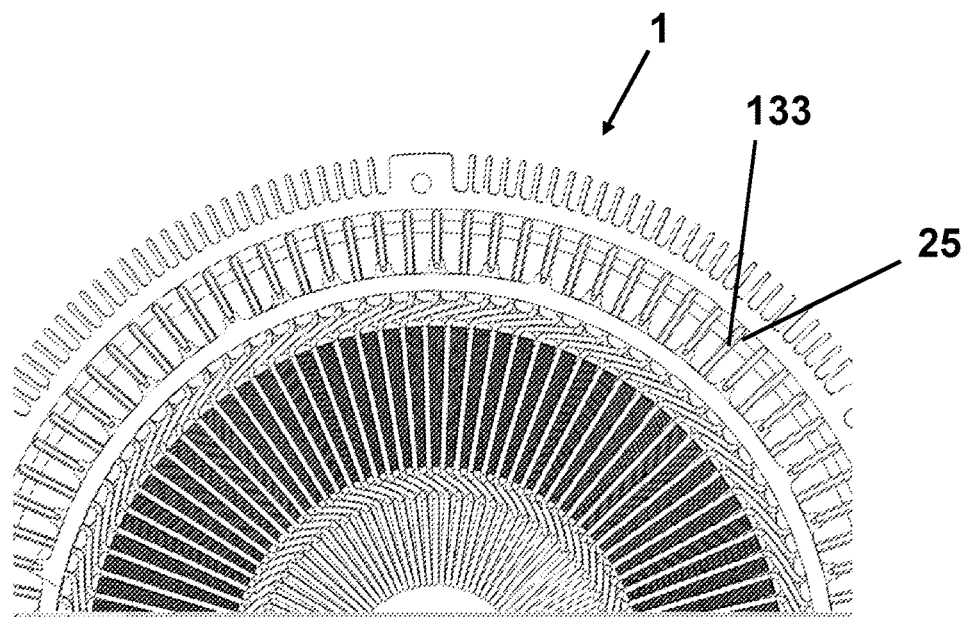
FIG. 12B is a plan view of the stator assembly of FIG. 12A, showing how the conductive coils are received within the stator housing apertures.
Figure 12C:
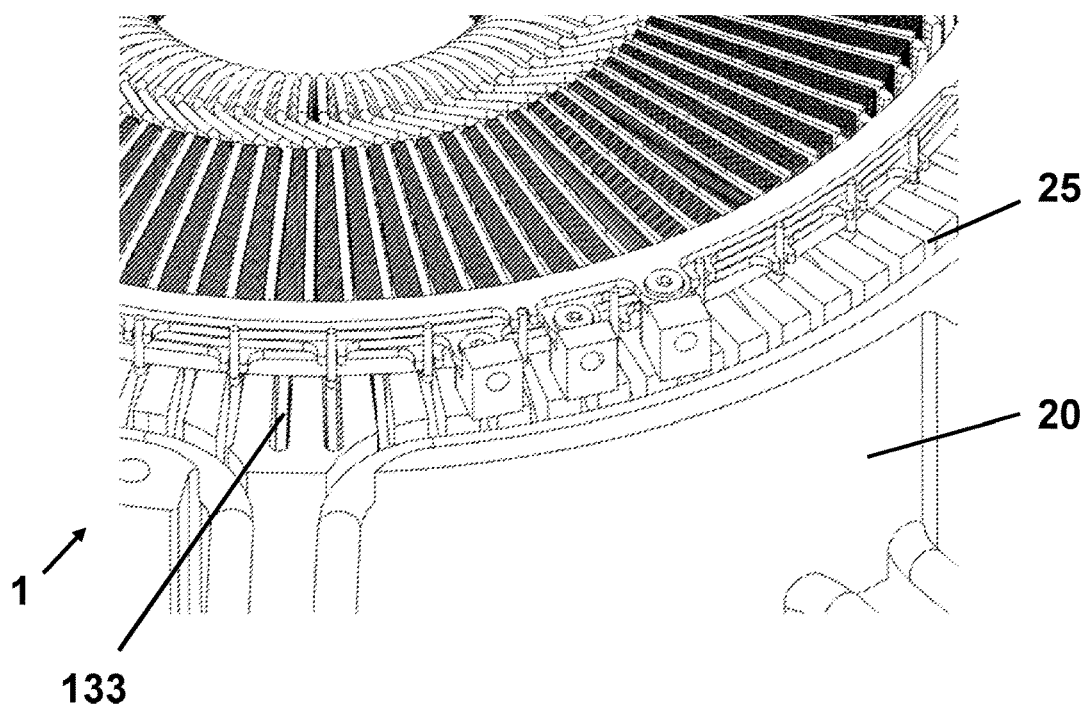
FIG. 12C is a perspective view of the stator assembly of FIGS. 12A and 12B, showing the busbars and phase connections.

Briefly turning to FIGS. 12A-12C, there is illustrated a stator assembly 1 which can be seen to include an annular or ring-shaped stator housing 20 which houses the conductive components 10 of the stator 1. The core of the stator assembly 1, where the axial flux provided by the rotor magnets interacts with the radially flowing current flowing through the conductive components 10 to generate the torque that causes the rotors 2a, 2b to rotate, includes radially extending active sections of the conductive components 10 of the stator and flux guides 30 in the form of lamination packs. The flux guides 30, in the form of lamination packs, which may comprise grain-oriented electrical steel sheets surrounded by electrical insulation, are positioned in spaces between the radially extending active sections of the conductive components 10 of the core. The flux guides 30, in the form of lamination packs, act to channel the magnetic flux produced by the permanent magnets 21-24 between the current carrying conductors.

Figure 4A:
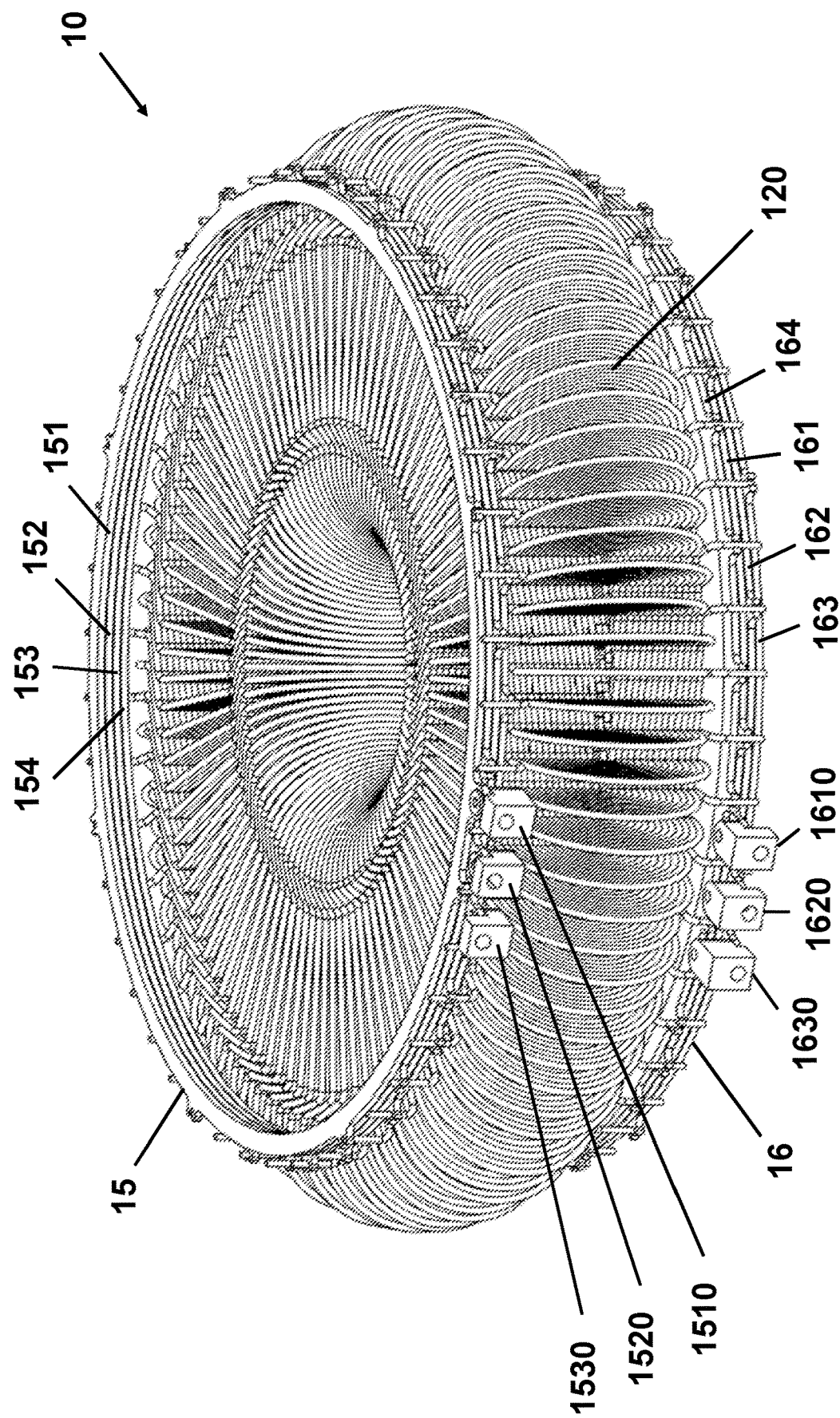
FIG. 4A is a perspective view of the conductive components of a stator assembly of an axial flux machine that includes 48 conductive coils.
Figure 4B:
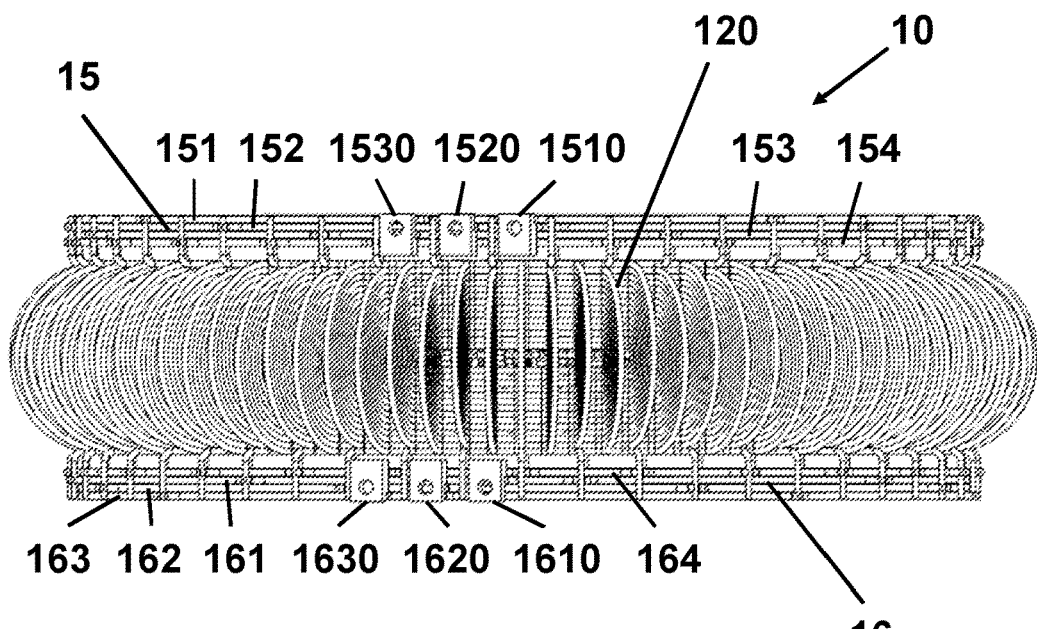
FIG. 4B is a side view of the conductive components of the stator assembly of FIG. 4A.
Figure 4C:
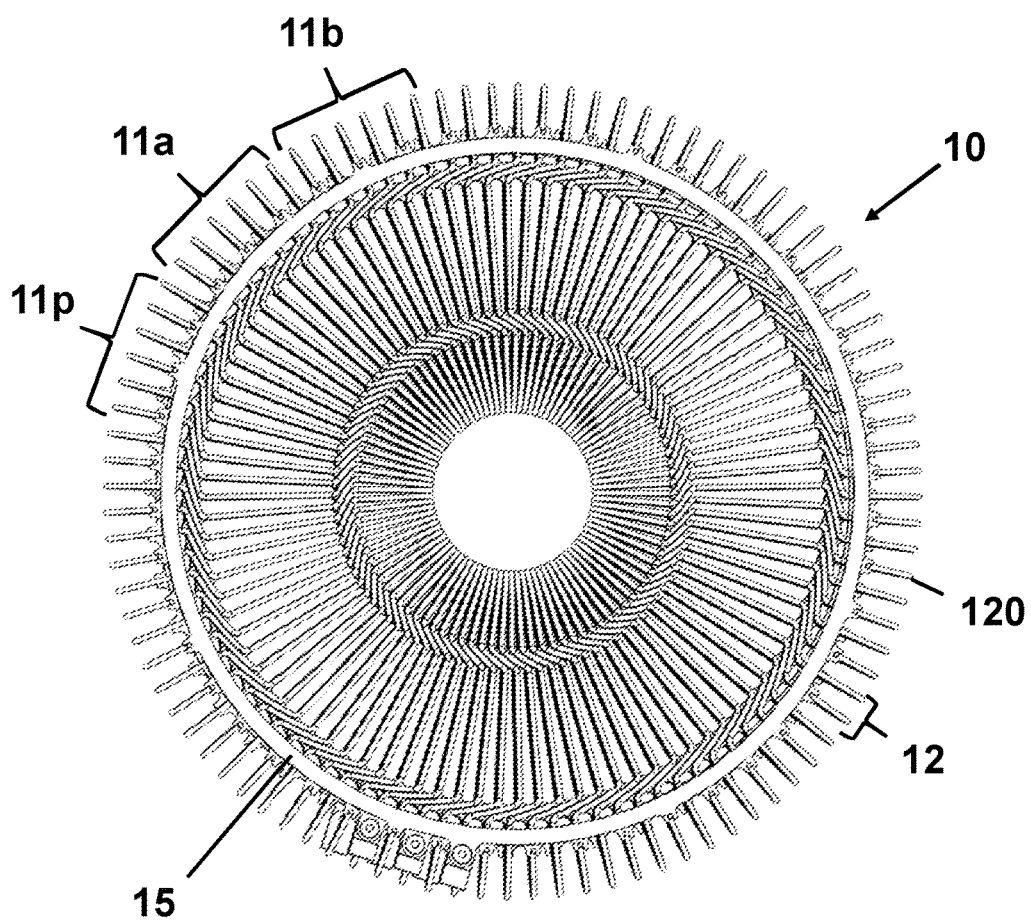
FIG. 4C is a plan view of the conductive components of the stator assembly of FIGS. 4A and 4B.

Now turning to FIGS. 4A-4C, the conductive components 10 (which from now on will be simply referred to as the "stator 10") are shown without the stator housing 20 or the flux guides 30, in the form of lamination packs. As is best appreciated from the top-down view of FIG. 4C, the stator 10 has distributed windings and comprises a plurality (in this case sixteen) of circumferentially distributed stator poles 11a, 11b, ..., 11p, each of which comprises a plurality of conductive coils 12. Each conductive coil 12 is connected to one phase of a multi-phase power supply via connection means 15, 16 which in this example take the form of busbars. In this specific example, the stator 10 is configured for use with a three-phase power supply so there are three conductive coils 12 per pole 11a-11p of the stator.

It will be appreciated that with sixteen poles 11a-11p and three conductive coils 12 per pole, the stator 10 of FIGS. 4A-C has a total of 48 circumferentially distributed conductive coils 12. However, it can be seen from the top-down view of FIG. 4C that this stator 10 actually has 96 radially extending active sections. Further, it can be seen from the side-on view of FIG. 4B that there are two axially offset layers of radially extending active sections, giving a total of 192 radially extending active sections. The reasons for this will become apparent from the description of FIGS. 5-9. In summary, each conductive coil 12 includes one or more conductive elements 120, each of which includes a pair of axially offset radially extending active sections. Each conductive coil 12 of the stator 10 of FIGS. 4A-4B includes two such conductive elements 120, and since each conductive element 120 includes a pair of axially offset radially extending sections, the total of 192 radially extending active sections is accounted for.

The conductive components of stator 10 may be made of any combination of one or more conductive materials. However, the conductive components 10 are preferably made from copper.

FIGS. 5A-5D are various views of a single conductive element 120. As noted above and as will be explained in more detail below, each conductive coil 12 is made up of one or more conductive elements 120. It will be appreciated that in the case of one conductive element 120 per conductive coil 12, a conductive coil 12 and a conductive element 120 are equivalent. FIGS. 6A-6D illustrate a conductive coil 12 which is made up of two conductive elements 120 and 120', and will be described below.

Returning to FIGS. 5A-5D, as is best appreciated from the top-down views of FIG. 5A in which the axis of rotation is perpendicular to the plane of the page, a conductive element 120 includes a pair of circumferentially pitched apart, radially extending active conducting sections 121a, 121b. These radially extending active sections 121a, 121b are referred to as "active" sections because, when the conductive coils 12 are positioned in the stator, they are disposed within the stator core and so interact with the magnetic field provided by the magnets of the rotors 2a, 2b. It will be appreciated that since the active sections extend in a generally radial direction, which is approximately perpendicular to the axial flux in the core, the flux linkage is at least close to maximized.

The angle $\gamma$ by which the two active sections 121a, 121b are pitched apart will be referred to as the coil span. The coil span can be the same as or different (less or more) than the pole pitch $\alpha$ (defined by the angle between the centres of the permanent magnets of the rotor). Preferably the coil span $\gamma$ is less than the pole pitch $\alpha$. For example, $\gamma$ may be approximately ⅚ of $\alpha$. By making $\gamma$ less than $\alpha$, shortchording of the winding can be implemented, which reduces the spatial harmonic content of the winding magnetomotive force (mmf).

Figures 5A, 5B:
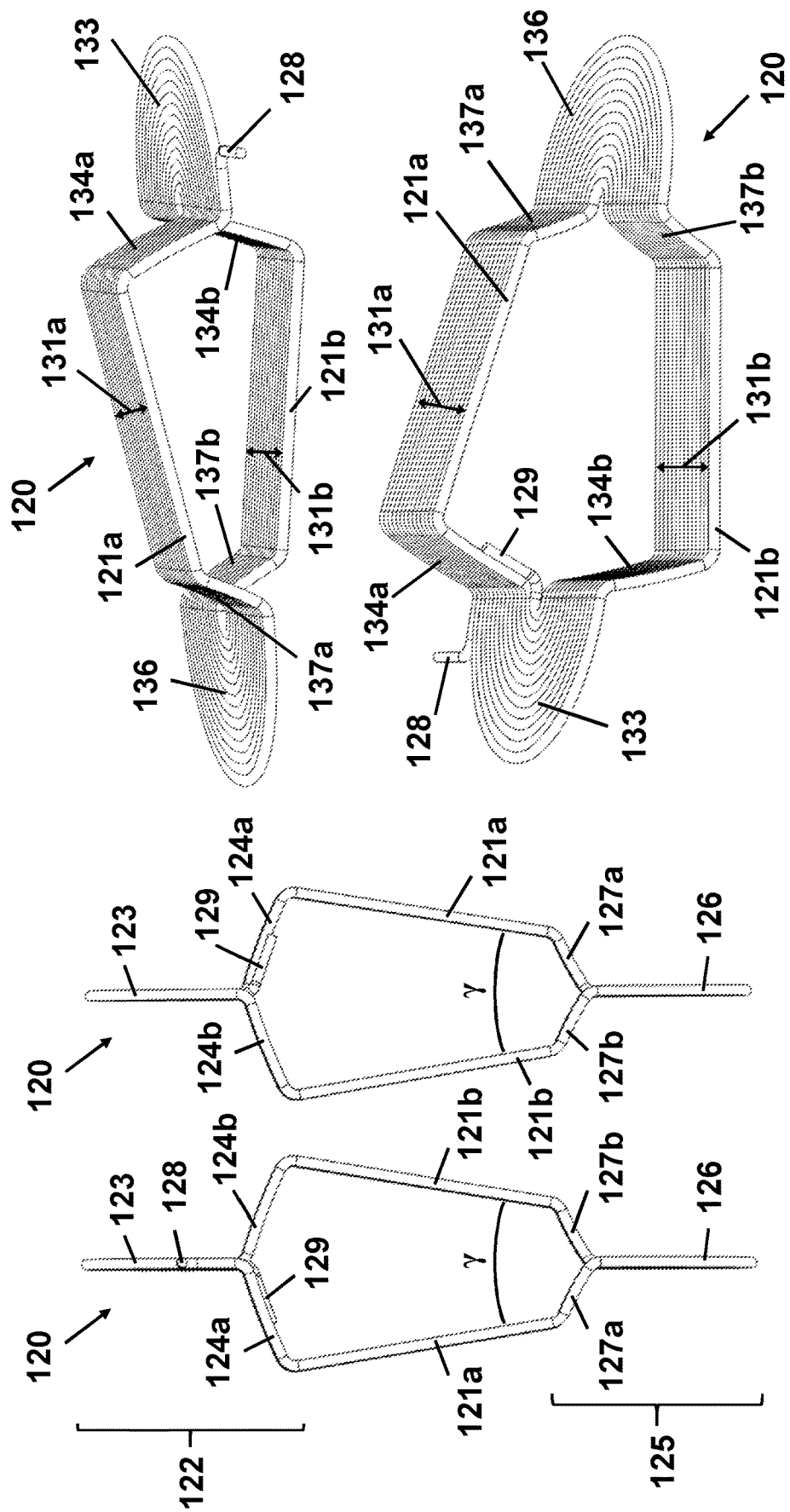
FIG. 5A shows plan and underneath views of a single conductive coil element having a single pair of radially extending active sections.
FIG. 5B shows two perspective views of the conductive coil element of FIG. 5A.
Figure 5E:
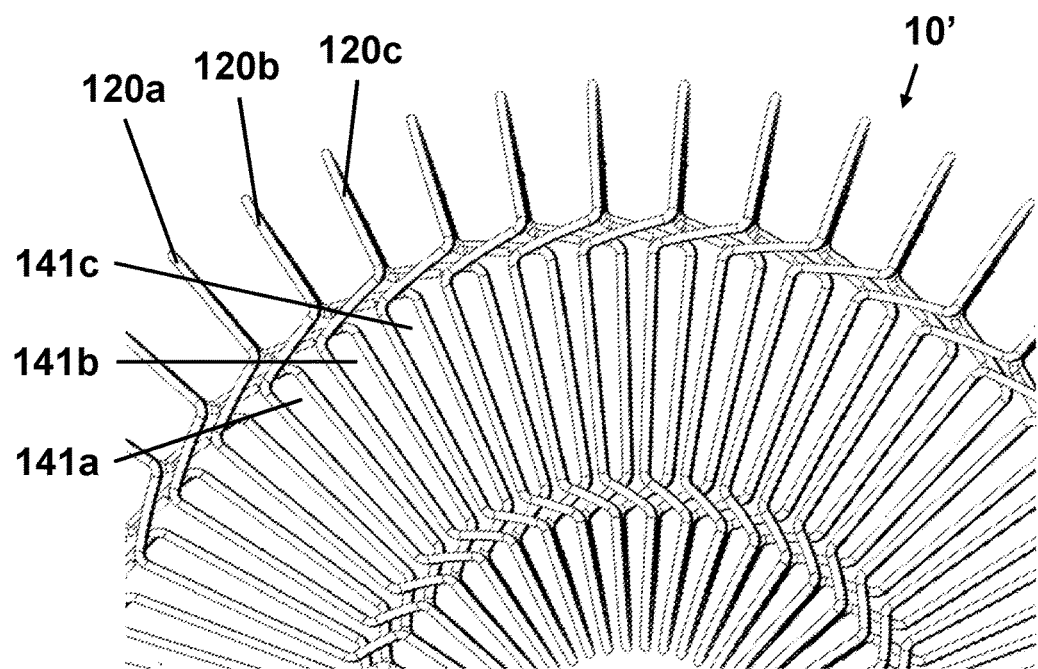
FIG. 5E is a plan view of part of a stator that includes a plurality of the conductive elements of FIGS. 5A-5D circumferentially distributed around the stator, showing spaces resulting from their overlap.
Figure 5F:
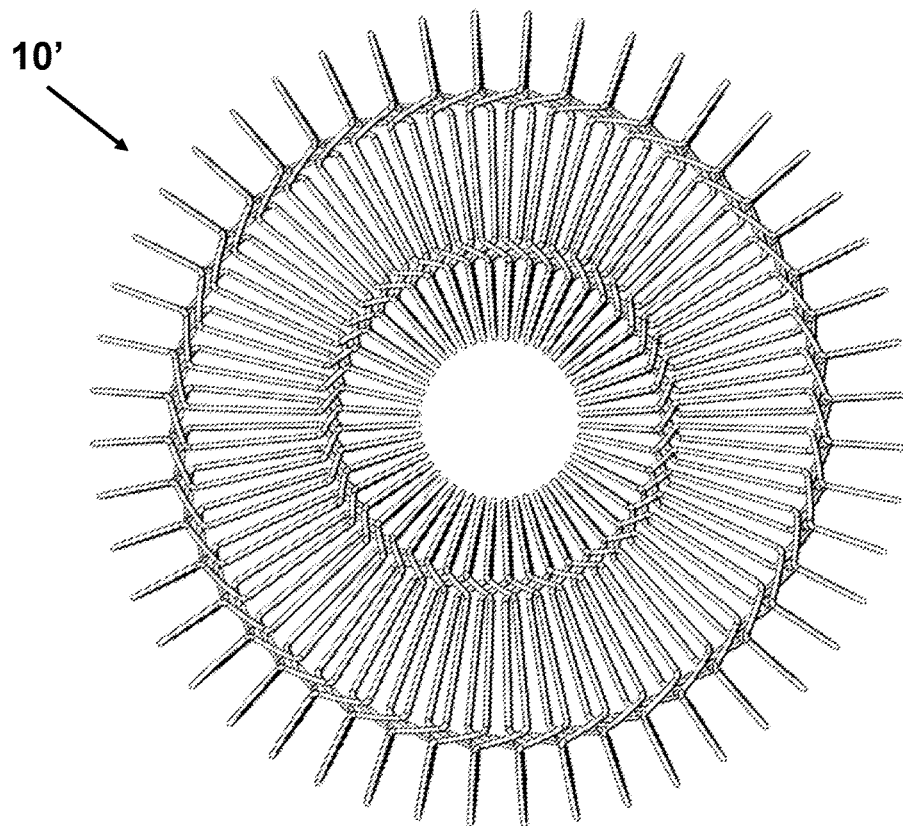
FIG. 5F is a plan view showing the stator of FIG. 5E.

Turning to FIGS. 5E and 5F, these show a sixteen-pole, three-phase stator 10' which is similar to the stator 10 of FIGS. 4A-4C, but differs in that each coil 12 of stator 10' has only one conductive element 120 (one pair of active sections 121a, 121b). That is, in FIGS. 5E and 5F, a coil 12 and a conductive element 120 are equivalent. Like stator 10, conductive coils 120a, 120b, 120c of stator 10' are circumferentially distributed around the stator and circumferentially adjacent coils circumferentially overlap.

As is particularly clear from FIG. 5E, the circumferential overlap of the coils 120a, 120b, 120c defines circumferential spaces between active sections of the coils. These circumferential spaces, which are elongated in the radial direction, can receive flux guides 30. Spaces such as the labelled spaces 141a, 141b, 141c will be referred to as spaces of the first type. As can be seen, spaces of the first type 141a, 141b, 141c are defined between active sections of different coils. For example, space 141b is between one of the two active sections of coil 120a and one of two active sections of coil 120c. However, it is to be appreciated that the two coils that define a particular space of the first type 141a, 141b, 141c can depend on various factors, including the number of phases per stator pole, the number of poles and the selected coil span $\gamma$.

Now returning to FIGS. 5A-5D, as can be seen from FIGS. 5B and 5D, the two active sections 121a, 121b are axially offset from each other. This facilitates stacking of the conductive coils 12 in the circumferential direction, and also facilitates the circumferential stacking of conductive elements 120 where there are multiple conductive elements 120 per conductive coil 12. As will be discussed in more detail with reference to FIG. 14, this allows for more stator poles and more slots per pole per phase, both of which can provide for greater efficiency. Furthermore, the winding may be readily short chorded.

As can be seen in each of FIGS. 5B, 5C and 5D, each conductive element 120 is formed from a continuous length of wound conductor. The outermost winding of the length of conductor terminates at a first connection portion 128, which will be referred to as the outer tail 128. The outer tail 128 extends substantially parallel to the axial direction. As will be described in more detail below, this facilitates convenient connection of the coils 12 to the multi-phase power supply. The innermost winding turn portion terminates at a second connection portion 129, which will be referred to as the inner tail 129.

As can also be seen in each of FIGS. 5B, 5C and 5D, the length of conductor that forms the conductive element 120 is wound such that there are a plurality of winding turn portions 131a, 131b stacked parallel to the axis of rotation of the electrical machine. The resulting cross-section of the conductive element 120 that is perpendicular to the radial direction of each active section 121a, 121b is elongate with a major dimension parallel to the axis of rotation. In the example of FIGS. 5A-5D, there are fourteen axially stacked winding turn portions 131a, 131b, though this is not intended to limit the invention as other numbers are equally possible.

FIGS. 5G, 5H and 5I illustrate how the conductive element 120 may be formed by winding a length of conductor. As illustrated in FIG. 5G, the conductor is wound around a pair of support elements 301, 302 (which protrude perpendicularly out of the plane of page) in a single plane so as to form a flat, planar winding with a number (in this case fourteen) of turns or layers. That the winding is flat is best appreciated from FIGS. 5H and 5I. The innermost winding terminates at the inner tail 129 and the outermost winding terminates at the outer tail 128.

Having formed the flat winding shown in FIGS. 5G-5I, the three-dimensional shape of the conductive element 120 is formed by bending or deforming the flat winding into the shape shown in FIGS. 5A-5D. The bending can be performed using a bending tool, as is known in the art. For example, a bending tool with axially offset inner male profile blocks may push against outer female forms to bend the flat winding so that the active sections are axially offset from each other. The outer tail 128 and inner tail 129 may be separately bent as desired.

To make the bending process easier, the flat winding may first be imparted with additional strength so that the winding maintains its shape during the bending. In one example, the conductor has a heat- or solvent-activated outer bond layer so that after winding, the turns/layers can be bonded together to maintain the shape.

It should be appreciated, particularly from FIGS. 5G-5I, that the conductive element 120 can be wound in a variety of different ways, and the particular winding that is illustrated is not intended to limit the invention. Some alternatives include:

While the winding in FIG. 5G has been wound around the support elements 301, 302 in an anti-clockwise sense, the length of conductor could equally be wound in the clockwise sense.

While the outermost turn of the winding terminates such that that outer tail 128 leads into an active section 121a, 121b of the conductive element 120, this need not be the case. The outer turn could terminate at any point of the turn, for example so that the outer tail 128 leads into a loop section of the turn rather than an active section.

While fourteen axially stacked winding turns are illustrated in FIG. 5, there could be more than or fewer than fourteen turns.

While the winding is one turn/layer thick (see FIG. 5H in particular), it could be more than one turn/layer thick. In this case, each conductive element 120 will comprise a plurality of circumferentially stacked winding turn portions. While any number of circumferentially stacked winding turn portions is possible, the number will preferably be less than the number of winding turn portions in the axial direction, such that the cross-section of the conductive element 120 that is perpendicular to the radial direction of each active section 121a, 121b still has a major dimension that is parallel to the axis of rotation. For example, the ratio of the number of axially stacked turns to the number of circumferentially stacked turns may be greater than three, and may preferably be greater than five.

As will be appreciated from the above, in use, current will flow along the two active sections 121a, 121b of the conductive element 120 in opposite directions (that is, inward and outward parallel to the radially extending direction). The reversal of the current direction is provided by outer loop sections 122 of the winding turn portions 131a, 131b and by inner loop sections 125 of the winding turn portions 131a, 131b. Each of the outer loop sections 122 includes a first portion 123 and a pair of second portions 124a, 124b (one for each of the pair of active sections 121a, 121b) which connect the active sections 121a, 121b to the first portion 123. Similarly, each of the inner loop sections 125 includes a first portion 126 and a pair of second portions 127a, 127b (one for each of the pair of active sections 121a, 121b) which connect the active sections 121a, 121b to the first portion 126.

Figure 5K:
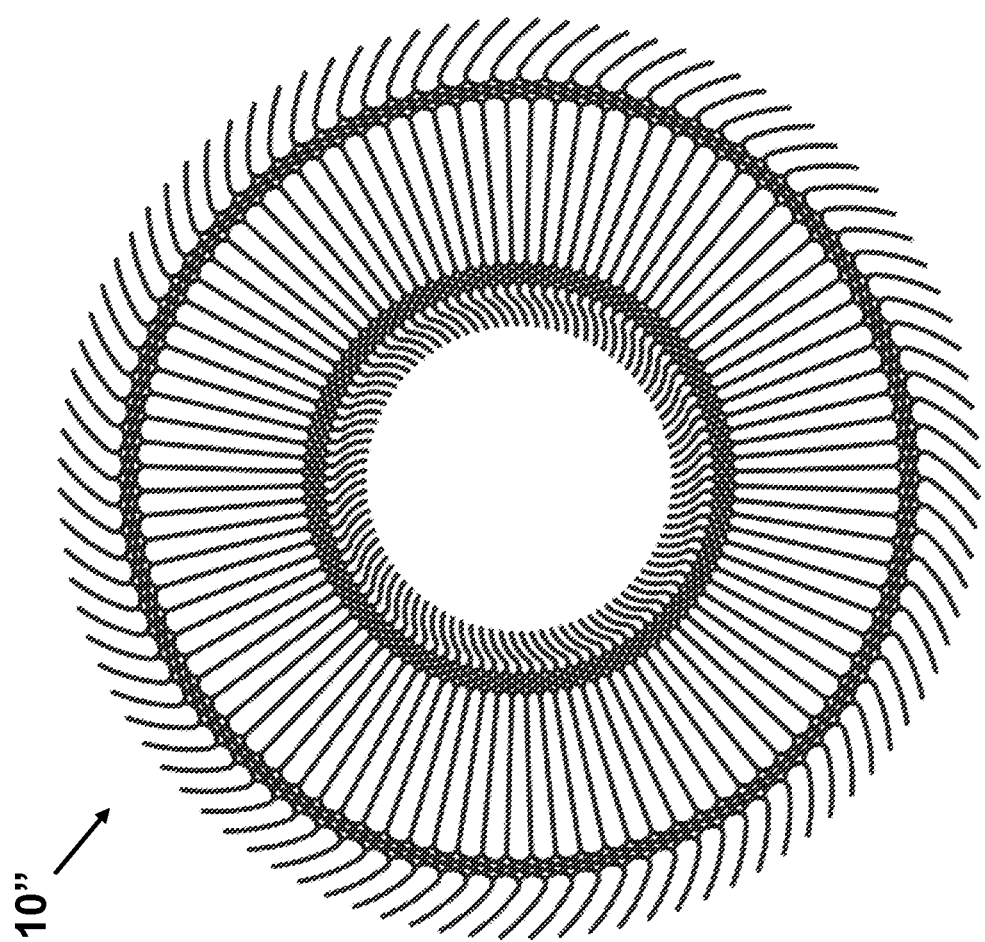
FIG. 5K is a plan view of a stator which utilizes a plurality of the conductive coil elements of FIG. 5J.
Figure 5J:
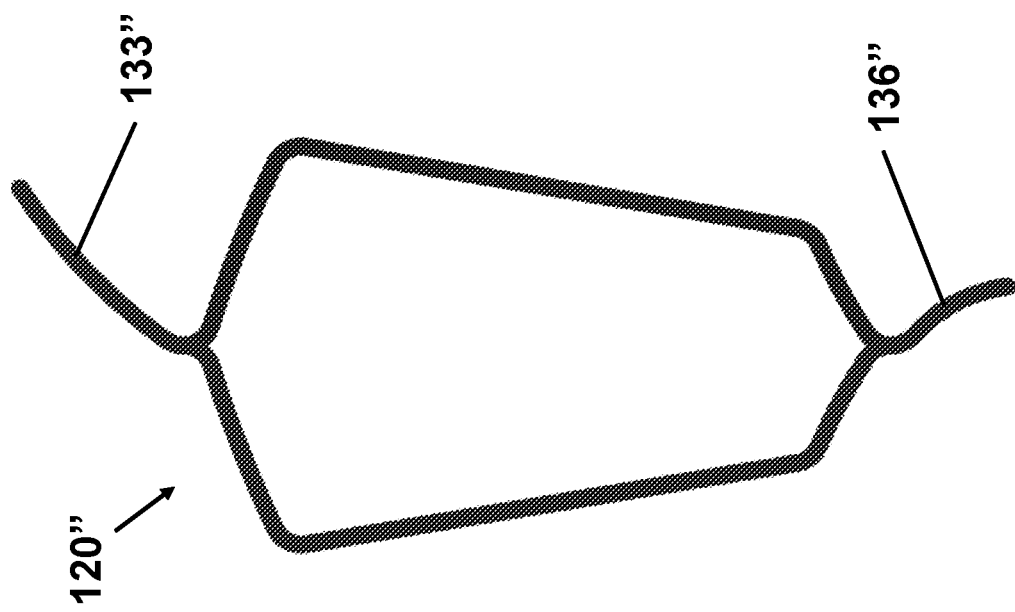
FIG. 5J is a plan view of an alternative conductive coil element.

As can be seen from FIGS. 5B, 5C and 5D, the outer first portions 123 together form an outer part 133 of the coil element 120 with a surface that is substantially parallel to the axis of rotation. In the specific example of FIGS. 5A-5D, the outer first portions 123 are substantially semi-circular and so the outer part 133 is a substantially flat half-disk 133, but other shapes are possible. For example, each of the outer first portions 123 may have a shape corresponding to three sides of a rectangle, such that they together form an outer part 133 which has a flat rectangular surface. As another example, the outer part 133 of the conductive element 120 formed by the outer first portions 123 need not be flat or planar: this is illustrated in FIG. 5J, which shows a conductive element 120" with an outer part 133" with a curved profile and therefore curved surface. FIG. 5K illustrates a plan view of a stator 10" comprising such conductive elements, which can be compared to FIG. 4C (though note that stator 10" does not show any connecting means 15, 16).

The surface 133 formed by the outer first portions 123 can be used to facilitate cooling due to its relatively large surface area. Further, since the outer part 133 of the coil 120 is substantially parallel to the axis is rotation, a stator housing 20 may be provided with axially extending apertures 25 which axially receive the outer part 133 of the coil element 120', 120" to provide mechanical locking and improved cooling. This will be explained in more detail below.

The inner first portions 126 together form an inner part 136 of the coil element 120. The inner part 136 illustrated in FIGS. 5B-5D is substantially the same as the outer part 133 described above, and like the outer part 133 described above may be parallel to the axis of rotation and may be of various shapes and profiles. However, the inner part 136 will generally play less of a role in cooling and stacking of the coils 12, and so the inner portions 126 may be configured so as to reduce the overall quantity of conductor per conductive element 120 to reduce costs.

With regards to the outer second portions 124a, 124b and the inner second portions 127a, 127b, while they appear substantially straight in FIGS. 5A-5D, they are in fact slightly curved. Specifically, the shape of each of the outer first portions 124a, 124b is a section of a first involute, and so the first portions 124a, 124b together form outer substantially involute parts 134a, 134b of the coil element 120. Similarly, the shape of each of the inner second portions 127a, 127b is a section of a second involute, and so the first portions 127a, 127b together form inner substantially involute parts 137a, 137b of the coil element 120. The significance of the involutes will be described with reference to FIGS. 6A-6D.

While it has been described above that the conductive element 120 is formed by winding a length of conductor, this is not essential. The conductive element 120 could be manufactured in other ways, including by being formed integrally.

Further, while the illustrated elements 120 are wound from a length of conductor and comprise a stack of winding turn portions 131a, 131b, this is preferred but not essential. For example, rather than axially extending stack of winding turn portions 131a, 131b, each conductive element 120 could be formed by a single axially extending conductive strip. In some cases a single axially extending conductive strip may be preferable to a plurality of axially stacked winding turn portions 131a, 131b but, as will be described below, the use of stacked winding turn portions 131a, 131b advantageously helps mitigate the skin and proximity effects which can otherwise lead to increased losses.

As noted above, each conductive coil 12 may include only one conductive element 120. However, for reasons which will be explained in more detail below, each conductive element preferably includes two or more circumferentially overlapping conductive elements. An example of a conductive coil that includes two circumferentially overlapping conductive elements 120, 120' will now be described with reference to FIGS. 6A-6D.

Figure 6A:
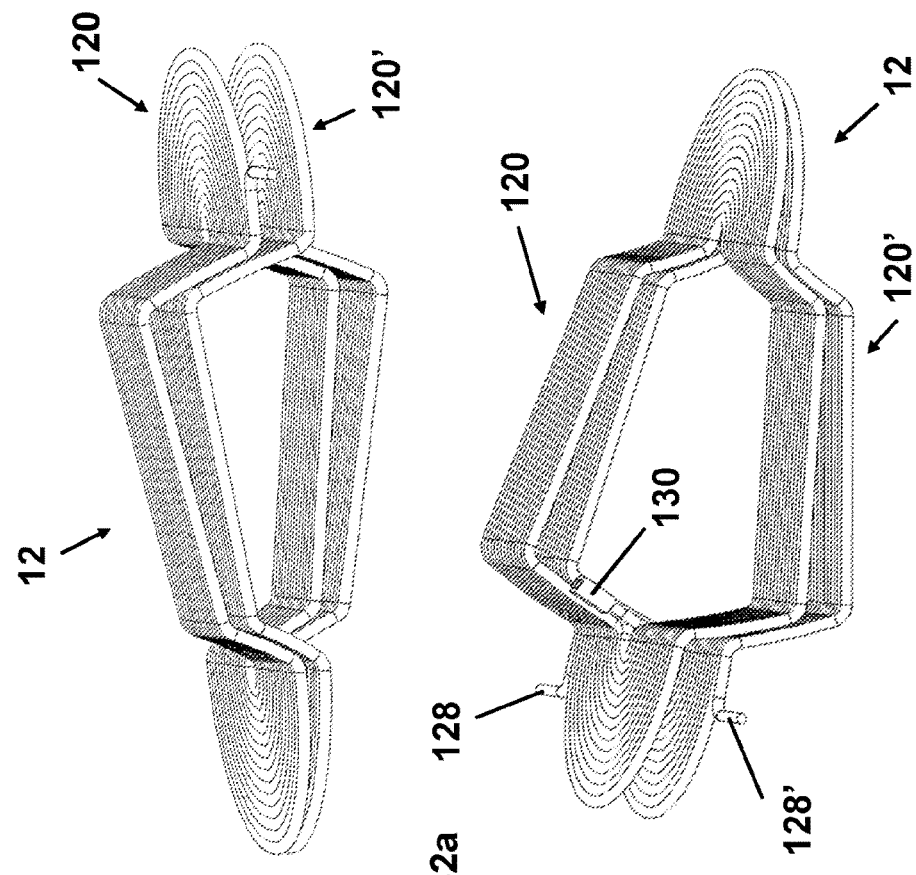
FIG. 6A shows plan and underneath views of a conductive coil that includes two pairs of circumferentially overlapping radially extending active sections connected in series.
Figure 6B:
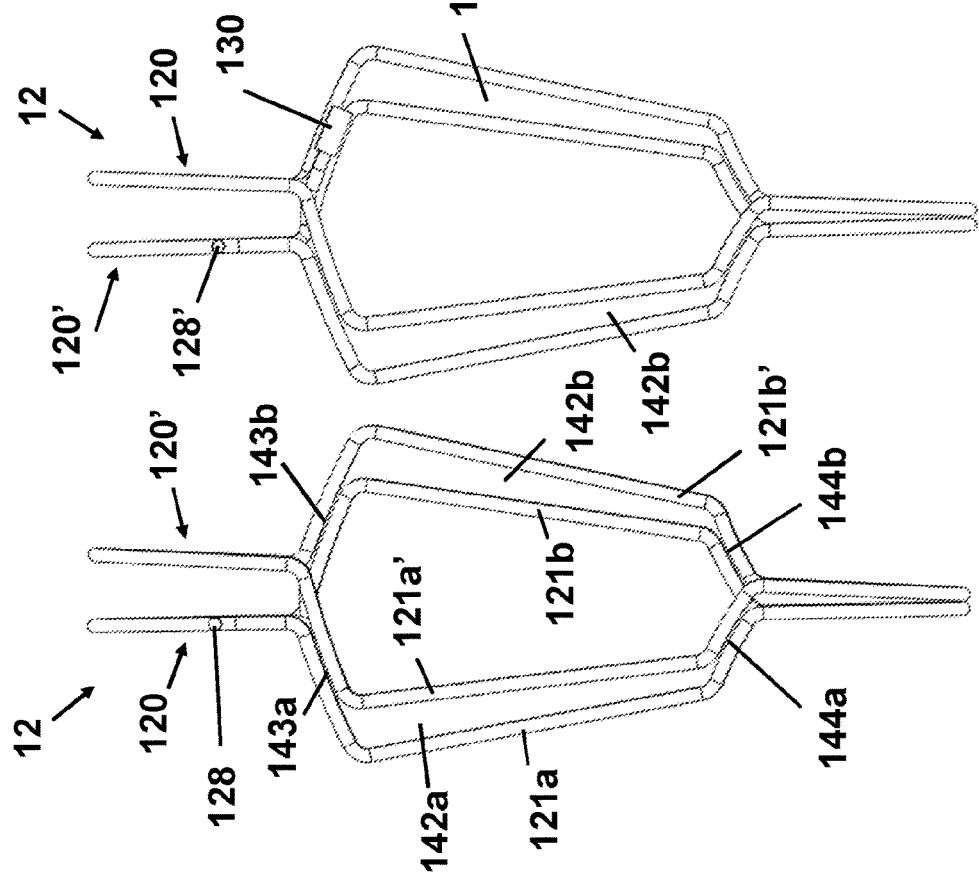
FIG. 6B shows two perspective views of the conductive coil of FIG. 6A.
Figure 6D:
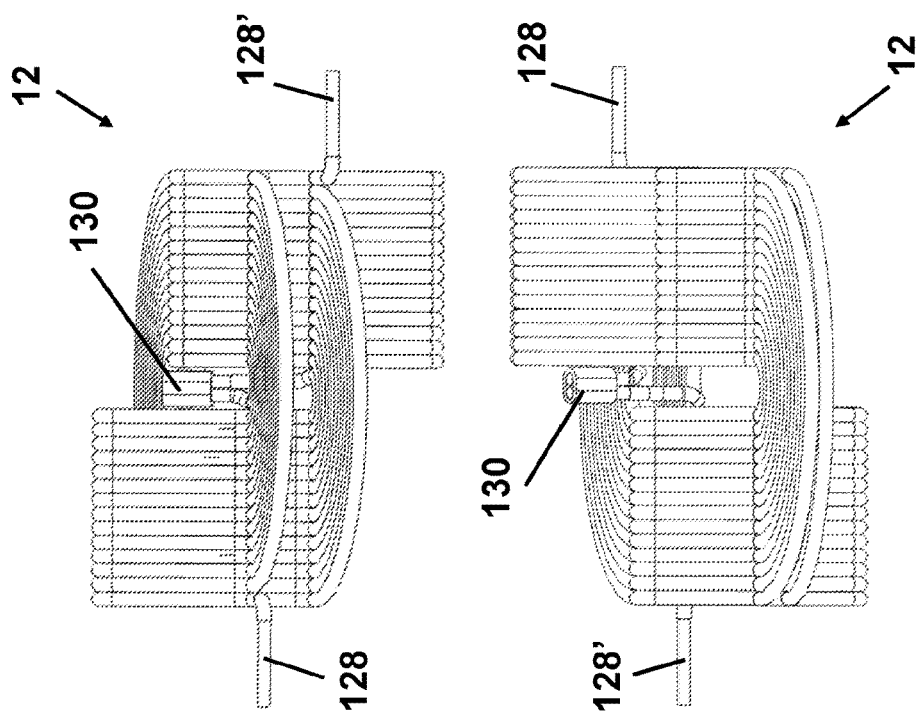
FIG. 6D shows front-on and rear-on views of the conductive coil of FIGS. 6A-6C.
Figure 6C:
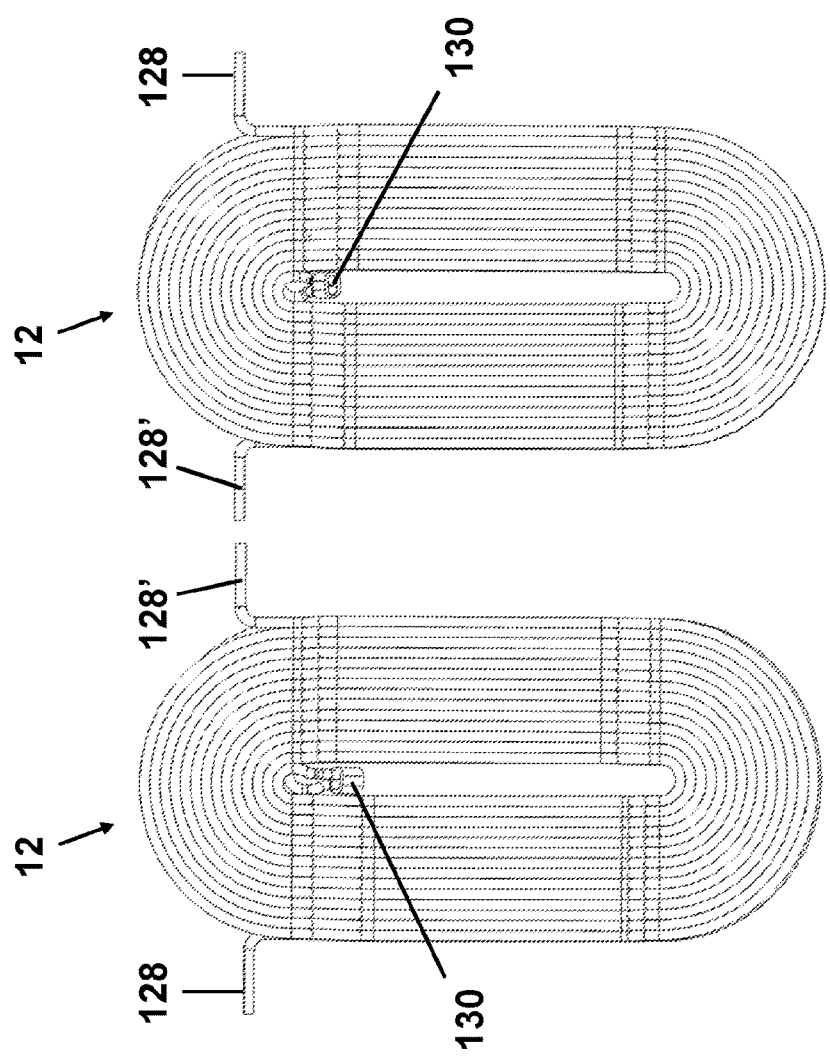
FIG. 6C shows two side views of the pair of the conductive coil of FIGS. 6A and 6B.

FIG. 6A shows above and below views of a conductive coil 12 which includes two conductive elements 120, 120'. The features of each of the two conductive elements 120, 120' are the same as those of the single conductive element 120 described above with reference to FIGS. 5A-5D, and so their features will not be described again.

To form the conductive coil 12, two identical conductive elements 120, 120' are electrically connected together in series at their inner tails 129, 129'. In the examples illustrated herein, the inner tails 129, 129' are connected using a ferrule 130. However, there are other ways of connecting the inner tails 129, 129', such as brazing or welding. To connect the two elements 120, 120', one of the two conductive elements 120, 120' is rotated 180° about the axis running vertically in the plane of the page in FIG. 6A so that the outer tails 128, 128' of the two conductive elements 120, 120' are in opposite directions and the inner tails 129, 129' are adjacent and therefore readily connected by a ferrule 130. Alternatively, the conductive coil 12 comprising two conductive elements could be integrally formed as a single piece.

The resulting conductive coil 12 has two pairs of circumferentially overlapping, pitched apart pairs of active sections 121a, 121b; 121a', 121b'. Notably, the overlap of the two pairs of active sections defines two spaces 142a, 142b. The first space 142a is defined between one (a first) active section 121a of a first of the conductive elements 120 of the coil 12 and between one (a first) active section 121a' of the second of the conductive elements 120' of the coil 12. The second space 142b is defined between the other (the second) active section 121b of the first conductive element 120 of the coil 12 and between the other (the second) active section 121b' of the second conductive element 120' of the coil 12. That is, the two spaces 142a, 142b are circumferential spaces between adjacent active sections 121a, 121a'; 121b, 121b' of two different pairs of active sections 121a, 121b; 121a', 121b' of the same coil 12. Spaces of this type will be referred to as spaces of the second type. Like the spaces of the first type, spaces of the second type 142a, 142b provide spaces for flux guides 30, such as lamination packs. This makes it easier to construct the stator assembly 1, and also increases the number of slots per pole per phase of the stator assembly 1, which can increase the motor's efficiency.

Figure 11B:
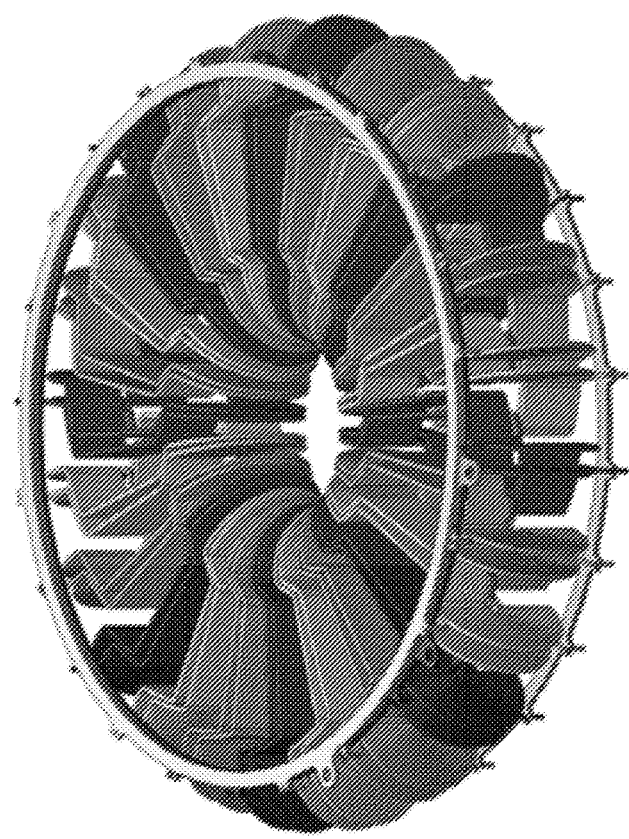
FIG. 11B is a perspective view of the stator assembly of FIG. 11A.
Figure 11A:
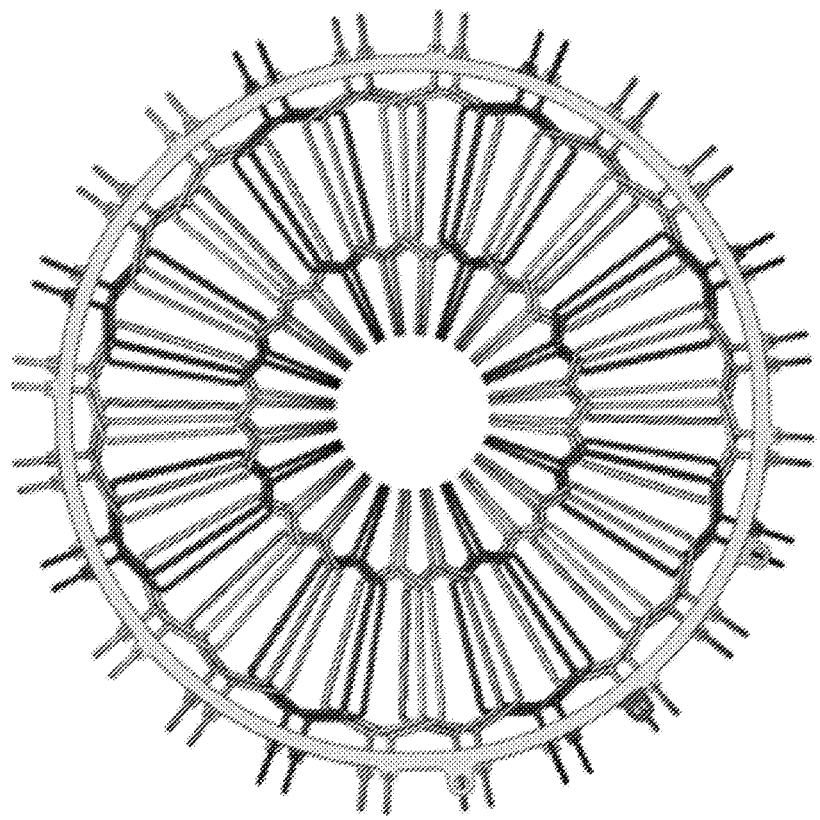
FIG. 11A is a plan view of half of the conductive components of a sixteen-pole, three-phase stator assembly that includes 24 conductive coils each having two pairs of radially extending active sections.

Having now described spaces 141a-c of the first type (that is, spaces defined between active sections of different coils) and spaces 142a-b of the second type (that is, spaces defined between active sections of the same coil but different pairs), it is noted that when a plurality of coils 12 which define spaces of the second type are provided in a stator 10 so as to define spaces of the first type, the spaces of the first and second types may coincide. This can be seen most clearly in FIG. 11A, which illustrates a sixteen-pole, three-phase stator in which each coil 12 comprises two conductive elements 120, 120'. Only half of the conductive coils 12 are shown in FIGS. 11A-B so that the spaces can be clearly seen. Whether spaces of the first and second type coincide may depend on a number of factors, including the selected coil span γ, the number of stator poles and the number of phases.

Returning to FIGS. 6A-6D, it can also be seen from FIGS. 6A and 6B that there is a gap 143a between the second portions 124a, 124a' of the outer loop sections 122, 122' which form one pair of outer involute parts 134a, 134a' of the two conductive elements 120, 120'. Likewise, there is a gap 143b between the second portions 124b, 124b' of the outer loop sections 122, 122' which form the other pair of outer involute parts 134b, 134b'. There is also a gap 144a between the second portions 127a, 127a' of the inner loop sections 125, 125' which form one pair of inner involute parts 137a, 137a'. Finally, there is also a gap 144b between the second portions 127b, 127b' of the inner loop sections 125, 125' which form the other pair of outer involute parts 137b, 137b'. Due to the geometric properties of involutes, the width of these gaps 143a, 143b, 144a, 144b remains substantially constant along the length of the involute sections of the conductive elements 120, 120'. This advantageously reduces the resulting diameter of the motor for a given rating and losses in the coils.

While a conductive coil 12 with two conductive elements 120, 120' has been described, it should be appreciated that a conductive coil 12 could have any integer number of conductive elements 120, including more than two. Increasing the number of conductive elements per conductive coil 12 will increase the number of spaces of the second type defined by the circumferentially adjacent active sections of the conductive elements 120, which in turn increases the number of slots per pole per phase in the stator 1. This can lead to the generation of a stator magnetic field with a more accurately sinusoidal magnetic flux density, with less significant harmonic distortion. This advantageously reduces the development of eddy currents in the permanent magnets of the rotors 2a, 2b, which in turn reduces heating losses and therefore provides a higher motor efficiency. However, it will be appreciated that the number of conductive elements 120 per conductive coil 12 will generally be limited by size constraints. For example, for a given cross-section of conductor (that is, the cross-section of the wire from which the windings are wound) and a given radius of the stator, the number of conductors which can be circumferentially fit into a single coil span γ is limited.

If a coil 12 is to have more than two conductive elements, there may be several further considerations. For example:

If the coils are to be formed by connecting multiple conductive elements 120 (by ferrules 130, for example), it may be preferable to provide several types of conductive elements to facilitate simpler connection of adjacent conductive elements. For instance, the conductive elements 120 described above may be used for the two circumferentially outer conductive elements, since their outer tails 128 will be connected to the power-supply. However, the one or more inner conductive elements that are between the outer conductive elements will be connected to conductive elements at both their inner tails 129 and outer tails 128, so a second type of conductive element with outer tails 128 adapted in a similar fashion to the inner tails 129 may be provided for ease of connection. Alternatively, each coil 12 may be formed as an integral unit, rather than by the connection of three or more separate conductive elements.

Integer multiples of two conductive elements 120 per coil 12 may be preferable to an odd number of conductive elements 120 per coil 12. If an integer multiple of two elements 120 are used, the outer tails 128 of the two circumferentially outermost elements 120 will be directed in opposite parallel directions, as in FIG. 6A-6D. While this is not essential, it provides for a more straightforward connection of the coils 12 using the connection means which will be described below with reference to FIGS. 7-10.

While a stator 10 with a single axial layer of circumferentially distributed coils 12 (the single layer having coils 12 with axially offset active sections) has been described, it will be appreciated that there may be multiple axially-stacked layers of coils per stator. In this case, the spaces of the first type and/or the spaces of the second type of each layer may advantageously substantially circumferentially coincide. This would advantageously allow for the insertion of axially-longer flux guides 30 which could extend through the axial length of the multiple axially-stacked layers, providing further gains in terms of ease and speed of assembly.

Connecting the Coils to a Multi-Phase Power Supply

Ways of connecting a plurality of circumferentially distributed conductive coils 12 to a multi-phase power supply will now be described. It should be appreciated that in practice there are many different ways which this could be accomplished, and many different ways will occur to one skilled in the art. The invention is therefore not limited to any particular connection arrangement. However, the described ways of connecting the conductive coils 12, which utilize connection means 15, 16 which are provided axially above/below a plane that is perpendicular to the axis of rotation and axially above/below the conductive coils, provides a particularly neat and well-organized set of connections. Further, the connections are easy to make, which reduces the likelihood of a poor connection, and the stator may be resin impregnated without impregnating the connection means, which allows connections to be checked and fixed even after impregnation of the stator assembly.

First referring to FIG. 4B, there is a first connection means 15 that is provided axially above a plane that is perpendicular to the axis of rotation of the motor 100 and that is axially above the conductive coils 12. There is also a second connection means 16 that is provided axially below a plane that is perpendicular to the axis of rotation of the motor 100 and that is axially below the conductive coils 12. In the case of the stator 10, which is configured for use with a 3-phase power supply, the connection means 15 and 16 include provision for each of the 3-phases. However, this could be extended to a multi-phase power supply with any number of phases.

In the particular connection arrangement of FIGS. 4A-4C, which will be referred to as a parallel connection arrangement, each of the connection means 15, 16 includes three phase-connections and one star-connection. That is, the first connection means 15 includes a first phase connection 151 for a first phase of the power supply, a second phase connection 152 for a second phase of the power supply, a third phase connection 153 for a third phase of the power supply, and a star connection 154. Similarly, the second connection means 16 includes a first phase connection 161 for the first phase of the power supply, a second phase connection 162 for the second phase of the power supply, a third phase connection 163 for the third phase of the power supply, and a star connection 164.

In the described examples, the phase connections 151-153, 161-163 and star connections 154, 164 are in the form of annular busbars whose outer circumference (though equally this could be the inner circumference) substantially coincides with the axially extending outer tails 128, 128' of the conductive coils. The phase connection busbars 151-153, 161-163 are themselves connected to the power supply via inputs 1510-1530, 1610-1630.

In the illustrated parallel connection arrangement, each conductive coil 12 is connected to one phase of the power supply by connecting the coil 12 to one of the phase connections of one of the connection means 15, 16 (as an example, phase connection 151) and to the star connection of the other of the connection means 15, 16 (in the example, star connection 164). The connection of one conductive coil 12 to one phase connection 151 and one star ring 164 is illustrated in and will now be described with reference to FIGS. 7A-7C.

Figure 7A:
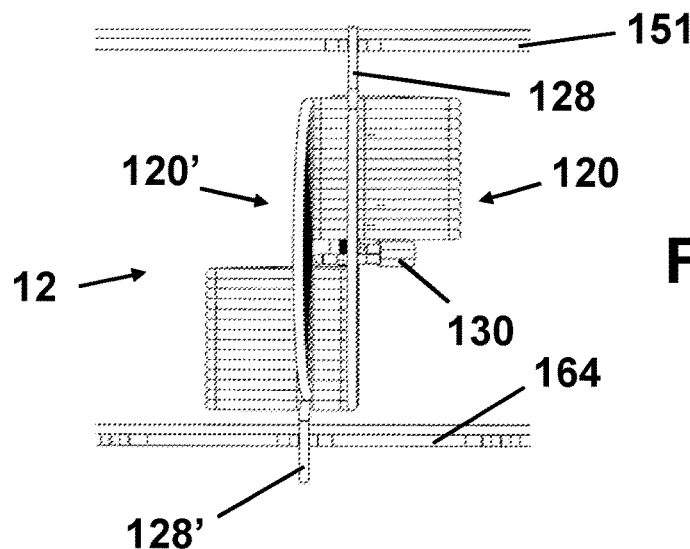
FIG. 7A is a front-on view showing the conductive coil of FIGS. 6A-6D connected to a pair of busbars.
Figure 7B:
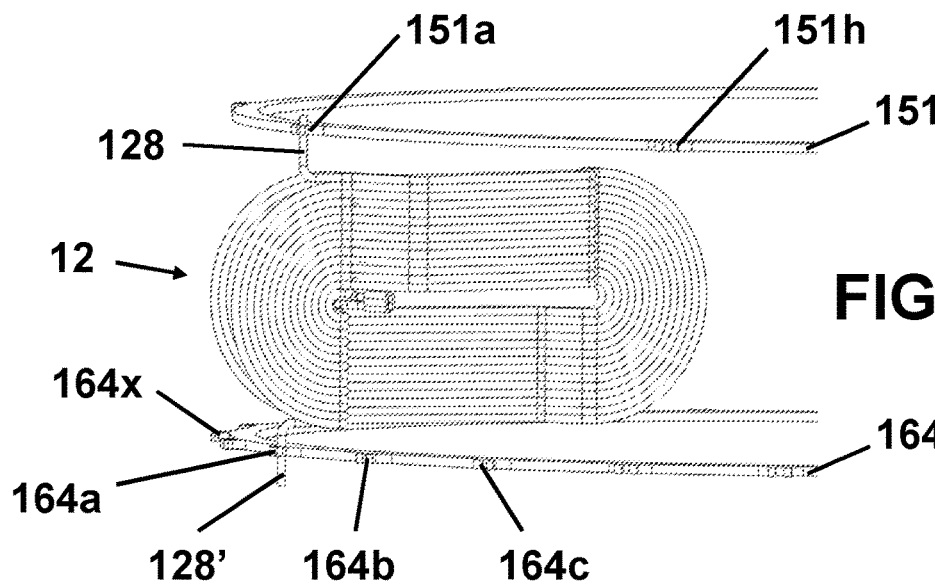
FIG. 7B is a perspective view of the conductive coil of FIGS. 6A-6D connected to the pair of busbars.
Figure 7C:
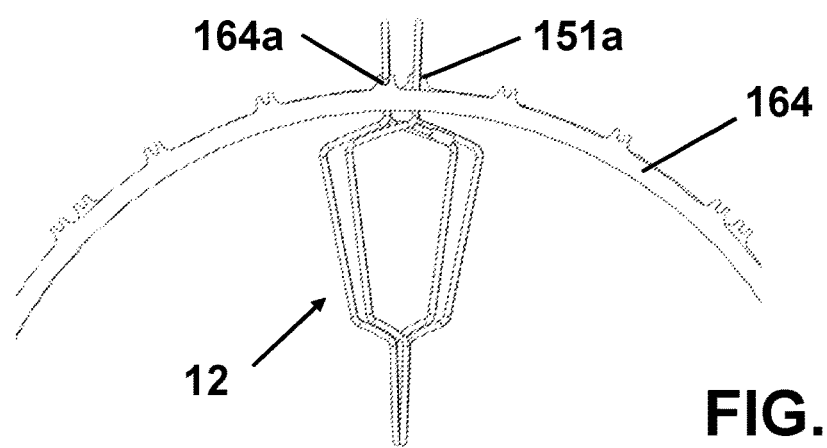
FIG. 7C is a plan view of the pair of the conductive coil of FIGS. 6A-6D connected to the pair of busbars.
Figure 8A:
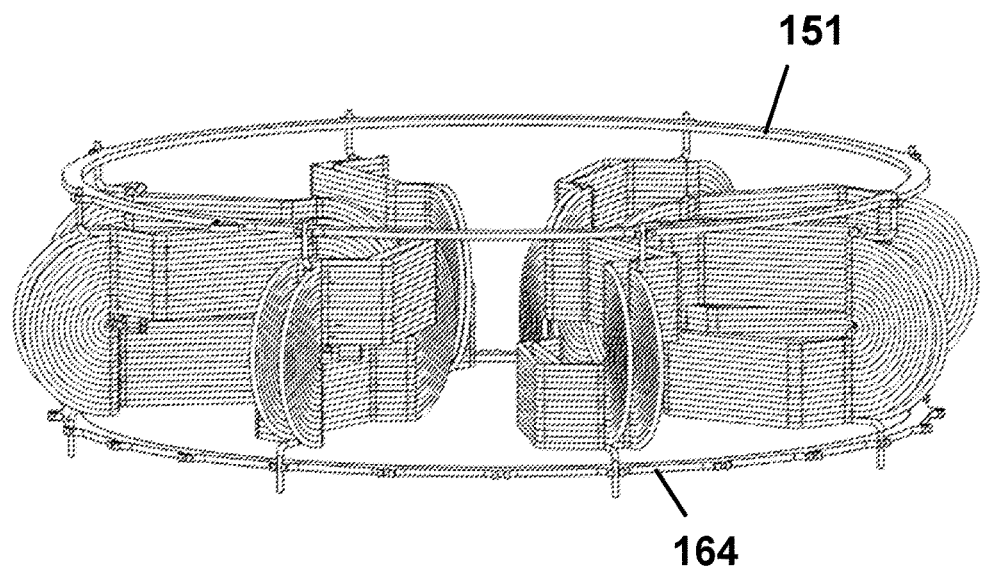
FIG. 8A is a perspective view of eight conductive coils connected to the same pair of busbars.
Figure 8B:
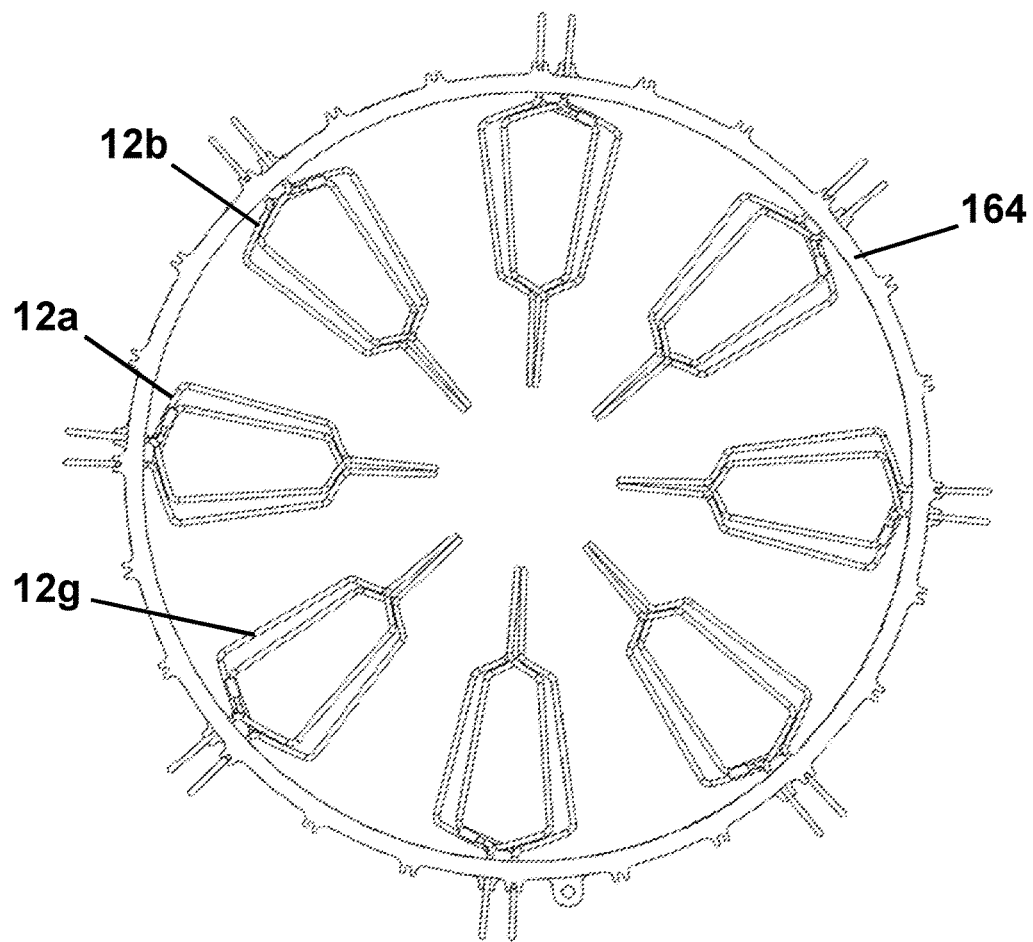
FIG. 8B is a plan view of the eight conductive coils connected to the same pair of busbars.

FIGS. 7A-7C show one conductive coil 12 that has two conductive elements 120, 120' connected to a first phase connection 151 from the first connection means 15, and to the star connection 164 from the second connection means 16. Since the outer tails 128, 128' of the conductive coil 12 extend axially and in opposite directions, and since the circumference of the busbars 151, 164 coincides with the axial extending outer tails 128, 128', the outer tails 128, 128' are easily connected to the connections 151, 164.

In order to make the connection even easier, the annular busbars 151, 164 are provided with circumferentially spaced apart receiving means 151a-h, 164a-x for receiving the axially extending outer tails 128, 128' of the coils 12. In the 3-phase parallel connection arrangement shown, each star connection 154, 164 will be connected to half of all coils 12, whereas each phase connection 151-153, 161-163 will only be connected to one in six coils 12. Consequently, in this example, the star connection 164 has three times as many equally spaced receiving means 164a-x than the first phase connection 151.

Returning to FIGS. 4A-4C, each pole 11a-11p of the stator 10 consists of one conductive coil 12 for each phase (i.e. three conductive coils 12 per pole 11a-p because the stator is configured for use with a 3-phase supply), and circumferentially adjacent conductive coils 12 are connected to different phases. This is illustrated in FIGS. 11A and 11B for a sixteen pole stator 10 which is connected to a 3-phase power supply but for which only half of the conductors are shown, and so has only 24 circumferentially distributed conductive coils 12 can be seen.

In view of this, in the 3-phase parallel connection arrangement illustrated in FIGS. 4, 7-9 and 11-12, every sixth conductive coil 12 will be connected to the connection means 15, 16 in the same way. This is illustrated in FIGS. 8A and 8B. It can be that there are eight equally spaced conductive coils 12a-g connected to the same phase connection 151 and the same star ring 164. Although not shown in FIGS. 8A-8B, it will be appreciated that halfway between each of the coils will be another coil 12 connected to the same phase of the power-supply, but by the complimentary set of bus bars. That is, to the phase connection 161 and the star connection 154.

The conductive coils 12 corresponding to the other phases of the power-supply will be connected in essentially the same way as described above for one phase. To illustrate this, FIGS. 9A-9C show how two circumferentially adjacent conductive coils 12 are connected in the parallel connection arrangement.

Figure 9A:
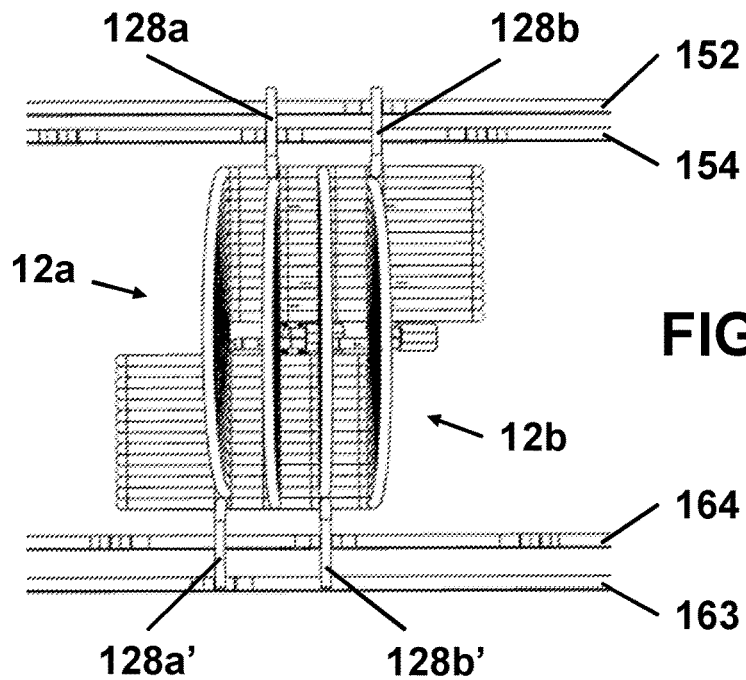
FIG. 9A is a front-on view of two circumferentially adjacent conductive coils connected to respective pairs of busbars.
Figure 9B:
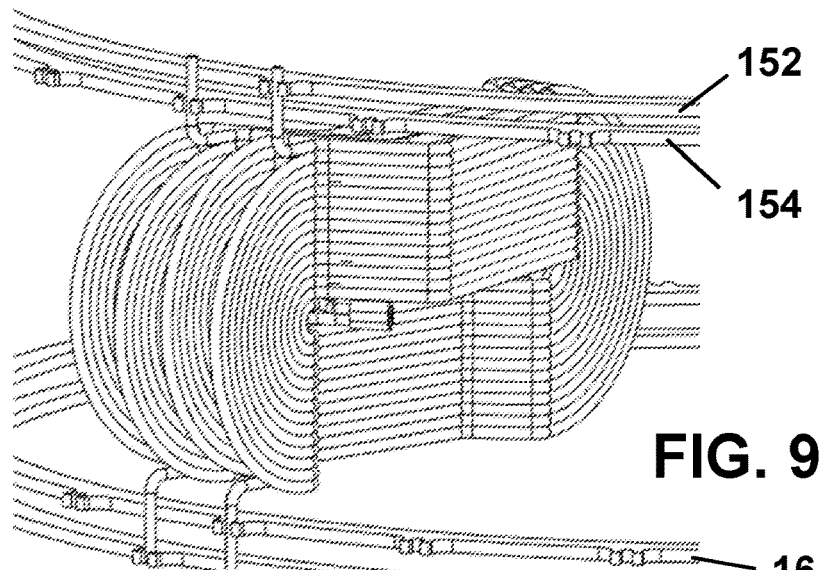
FIG. 9B is a perspective view of the two circumferentially adjacent conductive coils connected to respective pairs of busbars.
Figure 9C:
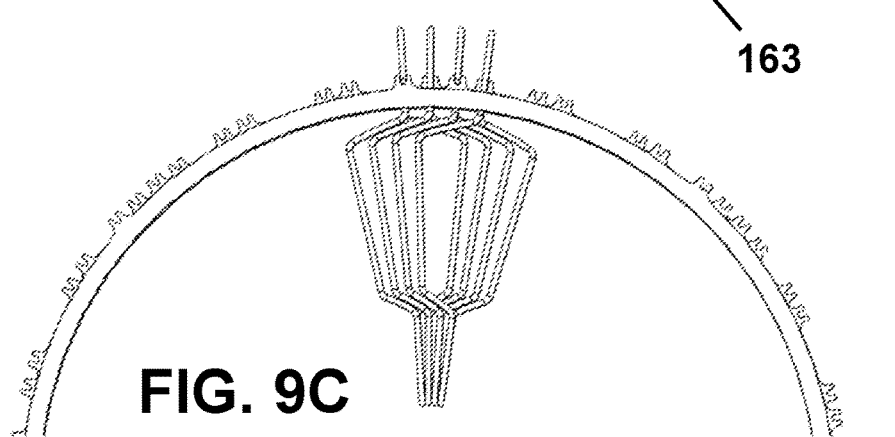
FIG. 9C is a plan view of the two circumferentially adjacent conductive coils connected to respective pairs of busbars.

FIGS. 9A-9C show two circumferentially adjacent conductive coils 12a, 12b. Conductive coil 12a is connected in a similar way as conductive coil 12 in FIGS. 7A-7C. That is, coil 12a is connected to the second phase connection 152 and the star connection 164. Coil 12b, being circumferentially adjacent to coil 12a, is connected to a different phase of the power supply and is therefore connected to a different pair of busbars. Specifically, but without loss of generality, circumferentially adjacent coil 12b is connected to the third phase connection 163 of the second connection means 16 and to the star connection 154 of the first connection means.

The connections of the conductive coils 12 have been described above with reference to a parallel connection arrangement. However, other connection arrangements are possible. To illustrate this, FIG. 10 shows an alternative arrangement, which will be referred to as a series connection arrangement.

Figure 10:
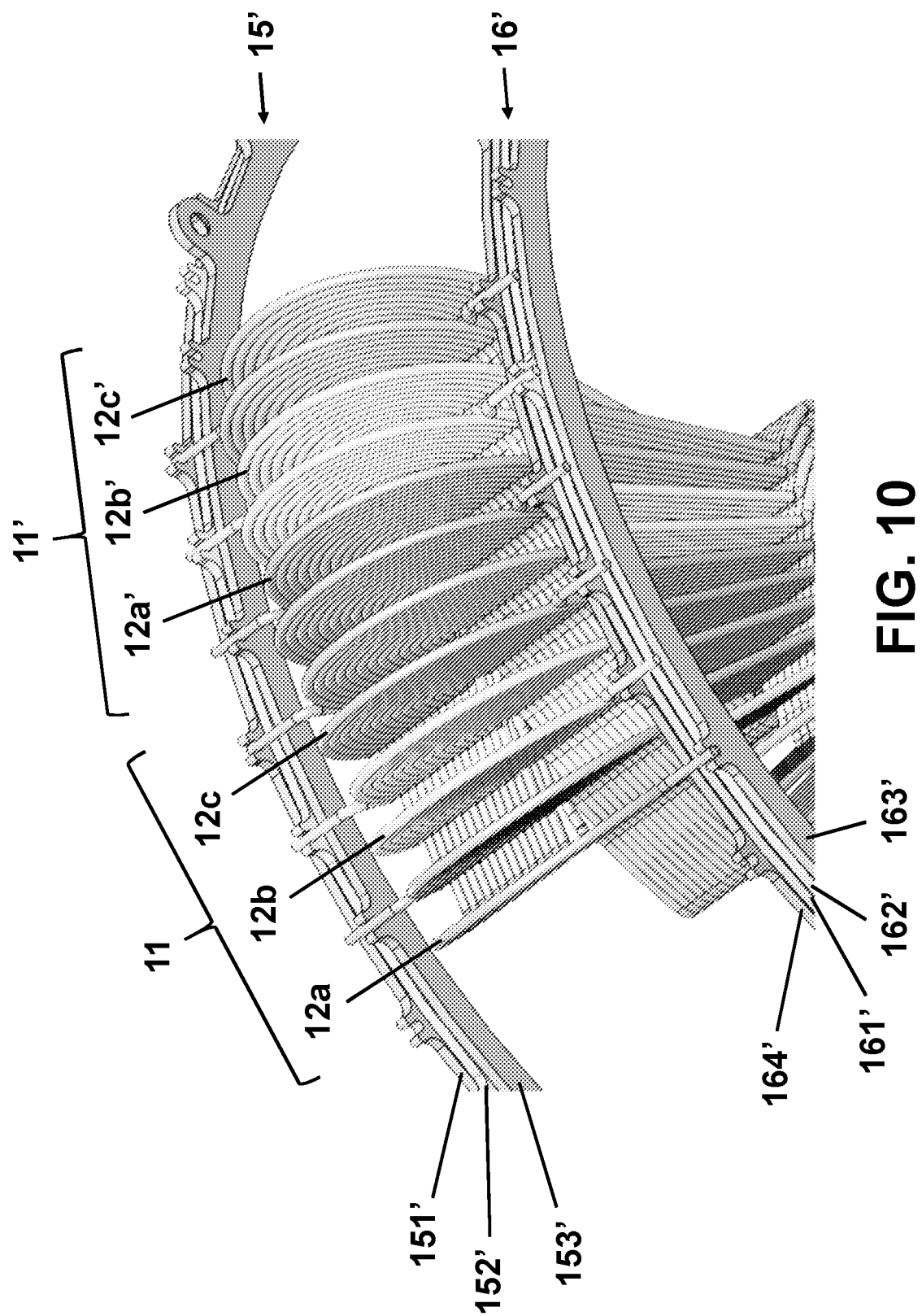
FIG. 10 is a perspective view of six adjacent conductive coils illustrating an alternative way of connecting the conductive coils to a 3-phase power supply.

In the series connection arrangement of FIG. 10, the first connection means 15' which is above the conductive coils 12 differs from the connection means 15 of FIGS. 4, 7-9 and 11-12 in that it does not include a star connection: it only includes a first phase connection 151', a second phase connection 152' and a third phase connection 153'. However, the second connection means 16' is the same as the second connection means 16 of FIGS. 4, 7-9 and 11-12 in that it has three phase connections 161', 162', 163' and a star connection 164'. To compensate for the lack of star connection in the first connection means 15', the conductive coils 12 are connected in a different way. The phase connections 151'-153' of the first connection means 15' also serve twice as many conductive coils 12, and therefore have additional receiving means compared to the receiving means of the second connection means 16' and the first and second connection means 15, 16 of the parallel connection arrangement.

FIG. 10 illustrates the series connection arrangement for two circumferentially adjacent stator poles 11 and 11'. Like the parallel connection arrangement, each pole 11, 11' includes one conductive coil per pole, giving three coils per pole: pole 11 consists of conductive coils 12a, 12b and 12c, and pole 11' consists of conductive coils 12a', 12b' and 12c'. Also like with the parallel connection arrangement, circumferentially adjacent coils are connected to different phases. However, while the coils of the same phase but adjacent poles (12a and 12a', for example) in the parallel connection arrangement are essentially independently connected and form separate current paths, in the series connection arrangement their connections are related and they are part of the same current path.

Considering only coils 12a, 12a' which are connected to the same phase, the coil 12a of the first pole 11 is connected by its outer tails to the phase connection 153' of the first connection means and to the phase connection 163' of the second connection means. The coil 12a' of the second, adjacent pole 11' is connected to the phase connection 153' of the first connection means 15' and to the star connection 164' of the second connection means. The current path can therefore be considered to run from the phase connection 163' through the coil 12a, then along phase connection 153' and then through coil 12a' to the star connection 164'.

Different connection arrangements may be used for different practical applications. For example, the series connection arrangement described above theoretically provides a machine Torque Constant (measured in Nm/A) that is twice as high as than that provided by the parallel connection arrangement described above. This will be better for some, though certainly not all, practical applications.

While the connection means 15, 15' have been described as being above the coils 12 and the connection means 16, 16' have been described as being below the coils, it should be appreciated that both pairs 15, 16; 15', 16' may be above the coils or both pairs 15, 16; 15', 16' may be below the coils. In this case, it may be preferable to produce coils 12 whose outer tails 128, 128' extend in the same axial direction rather than opposite axial directions.

Further, while the connection means 15, 16, 15' and 16' have been described as continuous, annular busbars, this is merely one way of implementing the connection means. For example, the connection means may not be continuous or annular, and may instead take the form of a series of two or more circumferentially distributed busbar sections. Many other kinds of connection means will occur to those skilled in the art.

Stator Manufacture

The features and construction of the conductive coils 12 described above provide for particularly efficient and effective manufacture of a stator that includes a plurality of circumferentially distributed coils 12. Of particular significance is the fact that the coils 12 themselves provide a structure into which flux guides 30, for example in the form of lamination packs, can be provided. This makes placing of the flux guides 30 in the stator assembly 1 a comparatively straightforward and precise exercise, especially compared to many known manufacturing techniques which may involve winding coils around bobbin-like structures which house lamination packs, and then separately securing (using glue, for example) the wound bobbin-like structures into a stator housing. Various other advantages will be described.

Figure 13:
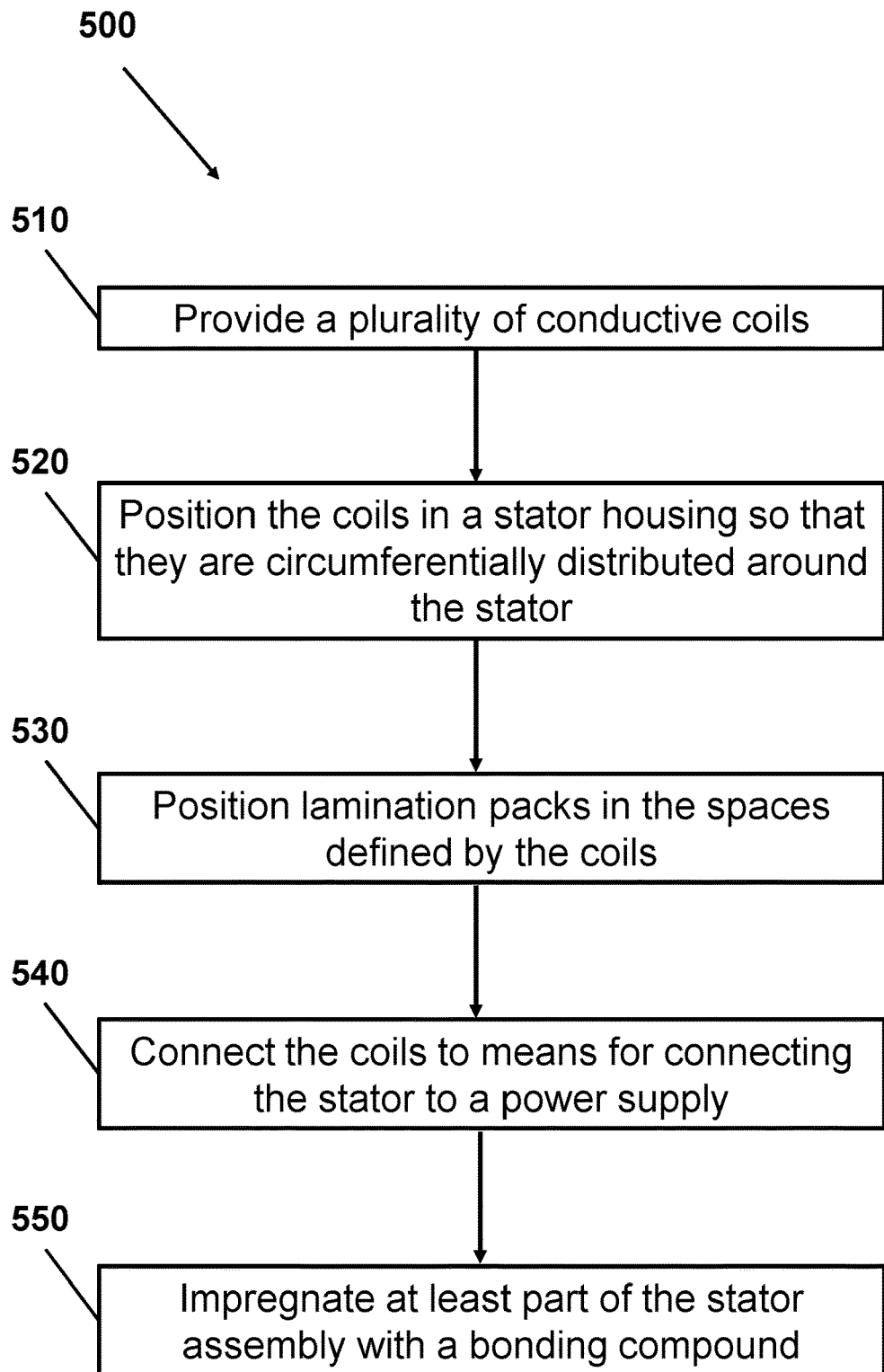
FIG. 13 is a flowchart illustrating a method of manufacturing a stator.

FIG. 13 is a flow-chart illustrating a method 500 for manufacturing a stator.

The method 500 includes providing 510 a plurality of conductive coils, such as the conductive coils 12 described above. Preferably the conductive coils 12 have a plurality of circumferentially overlapping pairs of circumferentially pitched apart radially extending active sections (as in the coil 12 of FIGS. 6A-6D) such that each coil 12 provides spaces of the second type. However, the coils 12 may only have one pitched apart pair of active sections (as in the coil of FIGS. 5A-5D). The conductive coils 12 may have been formed as a single integral piece, by connecting multiple conductive elements 120 in series, or in any other way.

At 520, the method 500 includes positioning a plurality of the conductive coils 12 in a stator housing so that the plurality of coils are circumferentially distributed around the stator housing. Preferably the conductive coils are positioned so that circumferentially adjacent conductive coils circumferentially overlap and thereby define spaces of the first type for receiving flux guides. The circumferential overlap of circumferentially adjacent coils 12 can be ensured by providing an appropriate number of coils 12 of an appropriate coil span γ within the housing. As noted above, where the coils 12 have multiple pairs of active sections such that the coils each define spaces of the second type, the spaces of the first and second types may coincide with each other.

The stator housing 20 may be provided with a plurality of circumferentially spaced apart axially extending apertures 25 for receiving the coils 12. This makes the positioning of the coils 12 in the stator housing easier and more precise. Advantageously, if the coils 12 are formed so as to have an axially extending outer part 133, the axially extending outer part 133 can be received within the axially extending apertures 25. Since the axially extending outer part 133 have a large surface area, they provide good mechanically locking of the coils 12 in the stator housing for assembly without the need for glue (for example) and also provide a source of cooling of the stator. Circumferentially distributed apertures 25 for receiving the coils 12 can most clearly be seen in FIGS. 12A-12C.

Optionally, at 530, the method 500 includes positioning flux guides 30, such as lamination packs, in the spaces (of the first and/or second type) defined by the coils 12. As explained above, the overlap of adjacent coils creates spaces of the first type 141a, 141b, 141c between active sections of different coils. If the coils 12 each comprise more than one pair of radially extending active sections (as in FIGS. 6A-6D), pairs of spaces 142a, 142a' of the second type will also be defined within each conductive coil 12. In either case, flux guides can also be positioned within the spaces. Since the coils 12 themselves provide a structure with defined spaces, positioning the lamination packs into the structure is straightforward, fast and precise. In combination with the provision of apertures 25 in the stator housing 20 for receiving the coils 12, this means that both the components of the stator core (the active sections of the coils 12 and the flux guides 30) can be quickly and very accurately positioned compared to many known techniques. It will be appreciated that accurately positioned core components reduces losses and therefore improves machine efficiency.

Optionally, at 540, the method 500 includes connecting the plurality of coils 12 to connecting means 15, 16 so that the coils can be connected to the multi-phase power supply. This may be done in any desired way, for example as described above using busbars in the parallel or series connection arrangements.

Optionally, at 550, the method 500 includes impregnating at least part of the stator assembly 1 in a bonding compound such as a resin. This strengthens the stator structure and therefore protects the stator assembly 1 against the electromagnet and mechanical forces it experiences in use. Furthermore, it can improve the conduction of heat between the stator constituents if the bonding compound has a heat transfer coefficient significantly higher than air.

If the connecting means 15, 16 are provided axially above and/or below the coils 12 as described above, the impregnation of the stator can take place before or after the coils are connected to the connecting means. Further, and advantageously, if the connecting means 15, 16 themselves are not impregnated, the connections can be tested, altered, and if necessary replaced after impregnation. This is highly desirable because a faulty connection in a resin-impregnated stator may otherwise render the entire stator unusable and unfixable.

Machine Efficiency

Axial flux machines 100 comprising the stator assembly 1 described herein have been found to provide not only a high peak efficiency, but a high efficiency over a broad range of operating parameters. While high peak efficiencies are often quoted, they are in practice rarely achieved, especially in applications where the machine is required to perform over a range of operating parameters. Efficiency over a broad range of parameters is therefore a more practically meaningful measure for many applications.

Figure 14:
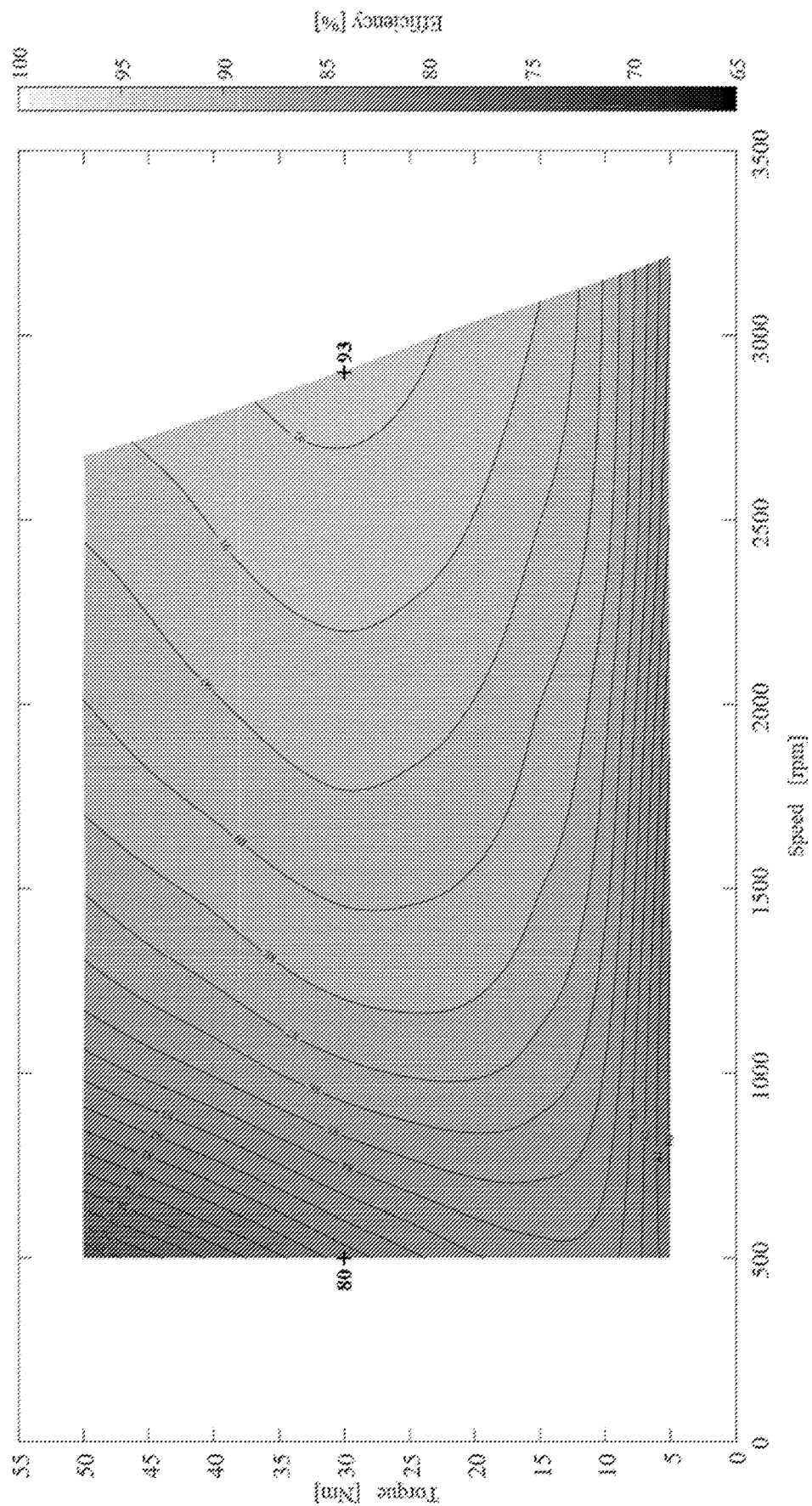
FIG. 14 is an efficiency map showing the efficiency of an axial flux machine comprising the stator assembly of FIGS. 12A-12C for a range of torque and speed values.

To illustrate this, FIG. 14 is an efficiency map showing the measured efficiency of an axial flux machine comprising the stator assembly of FIGS. 12A-12C for a range of torque and speed values that are commonly-used in many applications. Contours of constant efficiency are included on the efficiency map. As can be seen, as well as a high peak efficiency (93%), the efficiency remains very high for almost all of the area of the efficiency map and high (over 80%) even at a relatively low speed of 500 rpm up to a torque of 30 Nm.

There may be a number of different reasons for the high efficiencies which the stator assembly 1 is able to achieve. Some of these will now be described.

First, as explained above, the almost self-forming structure of the conductive components of the stator 10 that is provided by the geometry of the coils 12 allows for the very accurate placement of components of the stator core. The accurate placement of the components of the core means that there is better coupling of the stator and rotor fields, and a high degree of symmetry around the circumference of the stator which improves the generation or torque.

Another significant advantage is the generation of a stator field with a more accurately sinusoidal magnetic flux density. As will be understood by those skilled in the art, the higher the number of slots per pole per phase in the stator, the more sinusoidal the magnetic flux density can be. The coils 12 and stator 10 described above can provide an increased number of slots per pole per phase by increasing the number of conductive elements 120 per conductive coil 12, and this number can easily be scaled up (if, for example, the radius of the stator can be increased for a particular application). An advantage of a highly sinusoidal magnetic flux density is that the flux density has a relatively low harmonic content. With a low harmonic content, more of the coupling the rotor and stator fields involves the fundamental components of the flux density, and less involves the interaction with the harmonic components. This reduces the generation of eddy currents in the rotor magnets, which in turn reduced losses due to heating. In contrast, many known axial flux motors utilize a concentrated winding arrangement which only provides for a limited number (e.g. fractional) slot per pole per phase, which generates a much more trapezoidal flux density with more significant harmonic components.

While the coils 12 can be implemented using axially extending strips, they are preferably implemented using axially stacked winding arrangement illustrated in FIGS. 5A-5D and 6A-6D. While many motor manufacturers may consider this a disadvantage because it may be considered to reduce the fill factor in the stator core, the inventors have found this disadvantage is compensated for by the reduction in the skin and proximity effects which causes currents to flow around the outside of the conductor cross-section and predominantly the axially-outer portions of the active sections. The number of windings in the axial direction may be selected to balance these two considerations.

Described above are a number of embodiments with various optional features. It should be appreciated that, with the exception of any mutually exclusive features, any combination of one or more of the optional features are possible.

The invention claimed is:

1. A stator for an axial flux electrical machine, the stator comprising a plurality of circumferentially distributed conductive coils, each of the plurality of conductive coils configured to be connected to a phase of a multi-phase power supply and comprising at least one pair of active sections, wherein each active section extends in a generally radial direction substantially perpendicular to an axis of rotation of the electrical machine, wherein the generally radially extending active sections of each pair are pitched apart in a circumferential direction, and wherein circumferentially adjacent conductive coils circumferentially overlap to define spaces of a first type for receiving a flux guide, each space of the first type being a circumferential space between two adjacent active sections of two different coils, wherein each conductive coil comprises a plurality of pairs of active sections connected to each other in series, and wherein adjacent pairs of active sections circumferentially overlap so as to define a space of a second type for receiving a flux guide, the space of the second type being a circumferential space between two adjacent active sections of the same coil but different pairs of active sections of the coil.

2. The stator of claim 1, wherein, in use, current flows in opposite radial directions along the active sections of each pair of active sections of each coil.

3. The stator of claim 1, wherein the number of pairs of active sections of each coil is an integer multiple of two.

4. The stator of claim 1, wherein the plurality of pairs of active sections of each coil are either integrally formed or formed by connecting, in series, a plurality of separate elements which each comprise one pair of active sections.

5. The stator of claim 1, further comprising flux guides positioned in the first and/or second types of spaces.

6. The stator of claim 1, wherein the plurality of conductive coils are provided in a plurality of groups, each group corresponding to one pole of the stator.

7. The stator of claim 1, wherein circumferentially adjacent conductive coils are configured to be connected to different phases of the multi-phase supply such that, for an N-phase power supply, the stator comprises a plurality of groups of N conductive coils, each group of N conductive coils comprising one coil for each phase of the N-phase supply, each group corresponding to one pole of the stator.

8. The stator of claim 1, configured so that, in use, current flows in the same direction along adjacent active sections separated by one of the spaces of the second type for a flux guide.

9. The stator of claim 1, wherein the active sections of each pair of active sections are axially offset from each other.

10. The stator of claim 1, wherein each active section comprises a plurality of circumferentially stacked winding turning portions.

11. The stator of claim 1, wherein, for each phase of the multi-phase power supply, every second coil of the stator that is connected to said phase is connected to a common busbar.

12. A yokeless axial flux electrical machine comprising the stator of claim 1.

13. A stator for an axial flux electrical machine, the stator-comprising a plurality of circumferentially distributed conductive coils, each of the plurality of conductive coils configured to be connected to a phase of a multi-phase power supply and comprising at least one pair of active sections, wherein each active section extends in a generally radial direction substantially perpendicular to an axis of rotation of the electrical machine, wherein the generally radially extending active sections of each pair are pitched apart in a circumferential direction, and wherein circumferentially adjacent conductive coils circumferentially overlap to define spaces of a first type for receiving a flux guide, each space of the first type being a circumferential space between two adjacent active sections of two different coils, wherein each active section comprises a plurality of winding turn portions stacked parallel to the axis of rotation such that a cross-section perpendicular to the radial direction of each active section is elongate with a major dimension parallel to the axis of rotation.

14. The stator of claim 13, wherein the winding turn portions of the first and second generally radially extending active sections have proximal ends located at an inner radius and distal ends located at an outer radius, and wherein the proximal ends of the winding turn portions are connected by inner loop sections and the distal ends are connected by outer loop sections such that, in use, current flows in opposite radial directions along the pair of radially extending active sections.

15. The stator of claim 14, wherein the outer loop sections are configured to form an outer part of the coil that is substantially parallel to the axis of rotation, and/or the inner loop sections are configured to form an inner part of the coil that is substantially parallel to the axis of rotation.

16. The stator of claim 15, wherein each outer loop section comprises a substantially semi-circular or rectangular section such that the outer part of the coil is a half-disk or rectangular surface.

17. The stator of claim 15, further comprising a stator housing that comprises circumferentially distributed and axially extending apertures for receiving the outer parts of the conductive coils that are substantially parallel to the axis of rotation.

18. The stator of claim 14, wherein the outer loop sections are configured to form a substantially involute portion, and/or the inner loop sections are configured to form a substantially involute section of the coil.

19. The stator of claim 13, wherein each conductive coil comprises a plurality of pairs of active sections connected to each other in series, and wherein adjacent pairs of active sections circumferentially overlap so as to define a space of a second type for receiving a flux guide, the space of the second type being a circumferential space between two adjacent active sections of the same coil but different pairs of active sections of the coil.

20. A method of manufacturing a stator of an axial flux electrical machine, comprising:
    positioning a plurality of conductive coils in a stator housing so that the plurality of coils are circumferentially distributed around the stator housing, wherein conductive coils are positioned so that circumferentially adjacent conductive coils circumferentially overlap and thereby define spaces of a first type receiving a flux guide, the space of the first type being a circumferential space in the region where two coils overlap, and each conductive coil comprises a plurality of pairs of active sections connected to each other in series, wherein adjacent pairs of active sections circumferentially overlap so as to define a space of a second type for receiving a flux guide, the space of the second type being a circumferential space between two adjacent active sections of the same coil but different pairs of active sections of the coil; and
    positioning flux guides in the spaces of the first type.

* * * * *